(12) United States Patent
Sanghavi et al.

(10) Patent No.: US 10,911,460 B2
(45) Date of Patent: Feb. 2, 2021

(54) METHODS AND DEVICES FOR BLOCKING, DETECTING, AND/OR PREVENTING MALICIOUS TRAFFIC

(71) Applicant: Juniper Networks, Inc., Sunnyvale, CA (US)

(72) Inventors: Dilip H. Sanghavi, San Ramon, CA (US); Rishi K. Mutnuru, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 297 days.

(21) Appl. No.: 16/025,541

(22) Filed: Jul. 2, 2018

(65) Prior Publication Data

US 2020/0007548 A1    Jan. 2, 2020

(51) Int. Cl.
*H04L 29/06* (2006.01)
*H04L 12/745* (2013.01)
*H04L 29/12* (2006.01)
*H04L 29/08* (2006.01)

(52) U.S. Cl.
CPC .......... *H04L 63/101* (2013.01); *H04L 45/748* (2013.01); *H04L 61/1511* (2013.01); *H04L 61/256* (2013.01); *H04L 67/02* (2013.01)

(58) Field of Classification Search
CPC . H04L 63/101; H04L 45/748; H04L 61/1511; H04L 61/256; H04L 67/02
See application file for complete search history.

(56) References Cited

U.S. PATENT DOCUMENTS 7,849,502 B1     12/2010 Bloch et al.
8,225,400 B2 *   7/2012 Pacella .............. H04L 63/1441
                                                        726/1
9,501,764 B2 *  11/2016 Wu .................... H04L 67/02
(Continued)

FOREIGN PATENT DOCUMENTS

WO     2016164050 A1    10/2016

OTHER PUBLICATIONS

Extended European Search Report for Application No. EP19166003.4, dated Oct. 22, 2019, 7 pages.

*Primary Examiner* — Tongoc Tran
(74) *Attorney, Agent, or Firm* — Harrity & Harrity, LLP

(57) ABSTRACT

A network device obtains information, associated with blacklisted domains, that includes blacklisted domain identifiers, and sinkhole server identifiers associated with the blacklisted domain identifiers. The network device obtains a set of rules that specify match criteria, associated with the blacklisted domains, that include source network addresses and/or destination network addresses for comparison to packet source network addresses and/or packet destination network addresses associated with incoming packets. The set of rules specify actions to perform based on a result of comparing the match criteria and the packet source network addresses and/or the packet destination network addresses for the incoming packets. The network device receives packets, examines a packet source network address and/or a packet destination network address associated with the packets, compares the packet source network address and/or the packet destination network address to the match criteria, and performs an action based on a result of the comparison.

20 Claims, 13 Drawing Sheets

(56) References Cited

U.S. PATENT DOCUMENTS

| | | | |
|---|---|---|---|
| 9,560,072 B1* | 1/2017 | Xu | H04L 63/1441 |
| 9,729,565 B2 | 8/2017 | Reddy et al. | |
| 10,375,020 B2* | 8/2019 | Wing | H04L 63/20 |
| 10,554,616 B1* | 2/2020 | Teodosiu | H04L 61/15 |
| 2009/0070872 A1* | 3/2009 | Cowings | H04L 51/12 |
| | | | 726/23 |
| 2017/0295196 A1* | 10/2017 | Arnell | H04L 69/40 |

* cited by examiner

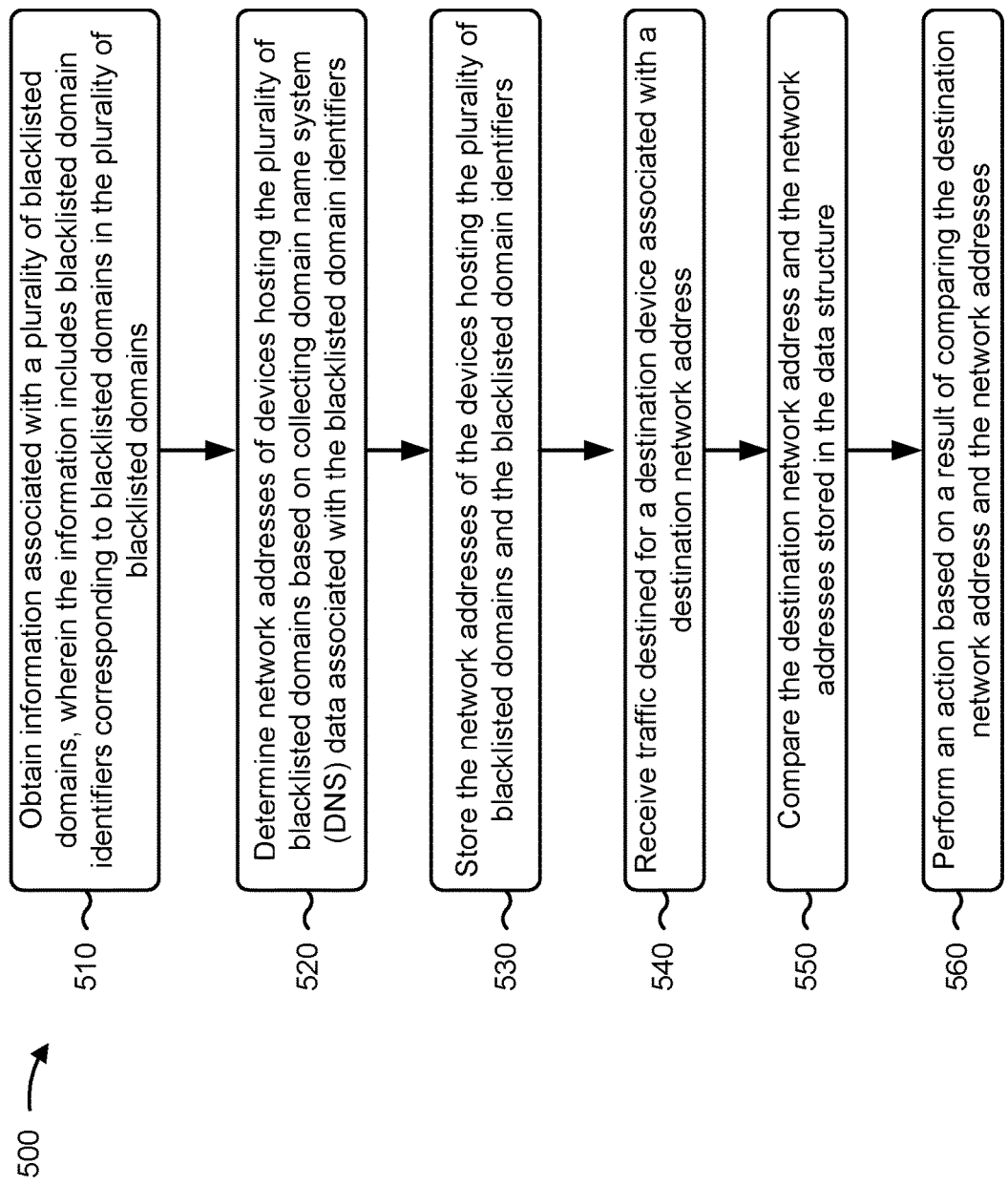

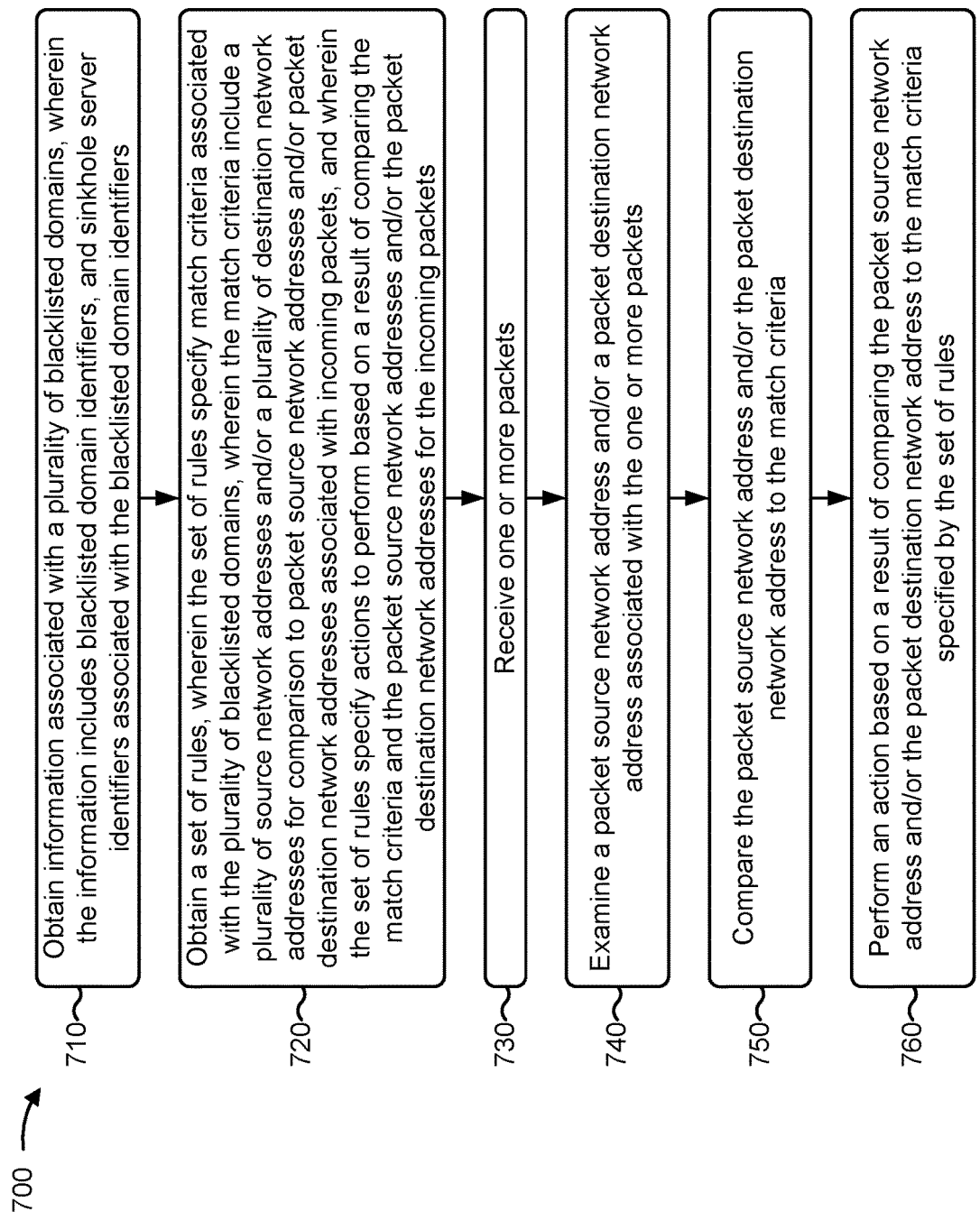

METHODS AND DEVICES FOR BLOCKING, DETECTING, AND/OR PREVENTING MALICIOUS TRAFFIC

BACKGROUND

The Domain Name System (DNS) is a protocol within the set of standards for how computers exchange data on the Internet and many private networks, known as the Internet Protocol Suite. A DNS service is used to resolve Internet protocol (IP) addresses associated with domain names. DNS sinkholing may be used to provide incorrect DNS resolution, by which the path of Internet traffic may be directed to different resources (e.g., a sinkhole server) instead of allowing access to malicious or inaccessible content. DNS sinkholing is a method of redirecting malicious Internet traffic so that the malicious Internet traffic may be captured and analyzed.

SUMMARY

According to some possible implementations, a method may include obtaining, by a processor, information associated with a plurality of blacklisted domains, wherein the information includes blacklisted domain identifiers corresponding to blacklisted domains in the plurality of blacklisted domains. The method may include determining, by the processor, network addresses of devices hosting the plurality of blacklisted domains based on collecting domain name system (DNS) data associated with the blacklisted domain identifiers, and storing, by the processor and in a data structure, the network addresses of the devices hosting the plurality of blacklisted domains and the blacklisted domain identifiers corresponding to the blacklisted domains in the plurality of blacklisted domains. The method may include receiving, by the processor, one or more packets destined for a destination device associated with a destination network address, comparing, by the processor, the destination network address and the network addresses stored in the data structure, and performing an action, by the processor, based on a result of comparing the destination network address and the network addresses.

According to some possible implementations, a method may include obtaining, by a processor, information associated with a plurality of blacklisted domains, wherein the information includes blacklisted domain identifiers corresponding to blacklisted domains in the plurality of blacklisted domains. The method may include obtaining, by the processor, a plurality of source network address prefixes, wherein source network address prefixes in the plurality of source network address prefixes are associated with possible attackers. The method may include receiving, by the processor, a domain name system (DNS) request or query, wherein the DNS request includes a request to access a destination domain associated with a destination domain identifier, and a source network address corresponding to a device from which the DNS request was received. The method may include determining, by the processor, that the destination domain identifier corresponds to a blacklisted domain identifier of the blacklisted domain identifiers, obtaining, by the processor, a threat level associated with the blacklisted domain identifier, and determining, by the processor, whether the threat level associated with the blacklisted domain identifier satisfies a threshold. The method may include comparing, by the processor, a prefix of the source network address and the plurality of source network address prefixes, and performing an action, by the processor, based on a result of whether the threat level associated with the blacklisted domain identifier satisfies the threshold, and a result of comparing the prefix of the source network address and the plurality of source network address prefixes.

According to some possible implementations, a network device may include one or more memories, and one or more processors, communicatively coupled to the one or more memories, to obtain information associated with a plurality of blacklisted domains, wherein the information includes blacklisted domain identifiers, and sinkhole server identifiers associated with the blacklisted domain identifiers. The one or more processors may obtain a set of rules, wherein the set of rules specify match criteria associated with the plurality of blacklisted domains, wherein the match criteria include a plurality of source network addresses and/or a plurality of destination network addresses for comparison to packet source network addresses and/or packet destination network addresses associated with incoming packets, and wherein the set of rules specify actions to perform based on a result of comparing the match criteria and the packet source network addresses and/or the packet destination network addresses for the incoming packets. The one or more processors may receive one or more packets, examine a packet source network address and/or a packet destination network address associated with the one or more packets, compare the packet source network address and/or the packet destination network address to the match criteria, and perform an action based on a result of comparing the packet source network address and/or the packet destination network address to the match criteria specified by the set of rules.

BRIEF DESCRIPTION OF THE DRAWINGS

FIG. 5 is a flow chart of an example process for blocking, detecting, and/or preventing malicious traffic.

FIG. 7 is a flow chart of an example process for blocking, detecting, and/or preventing malicious traffic.

DETAILED DESCRIPTION

Figure 1A:
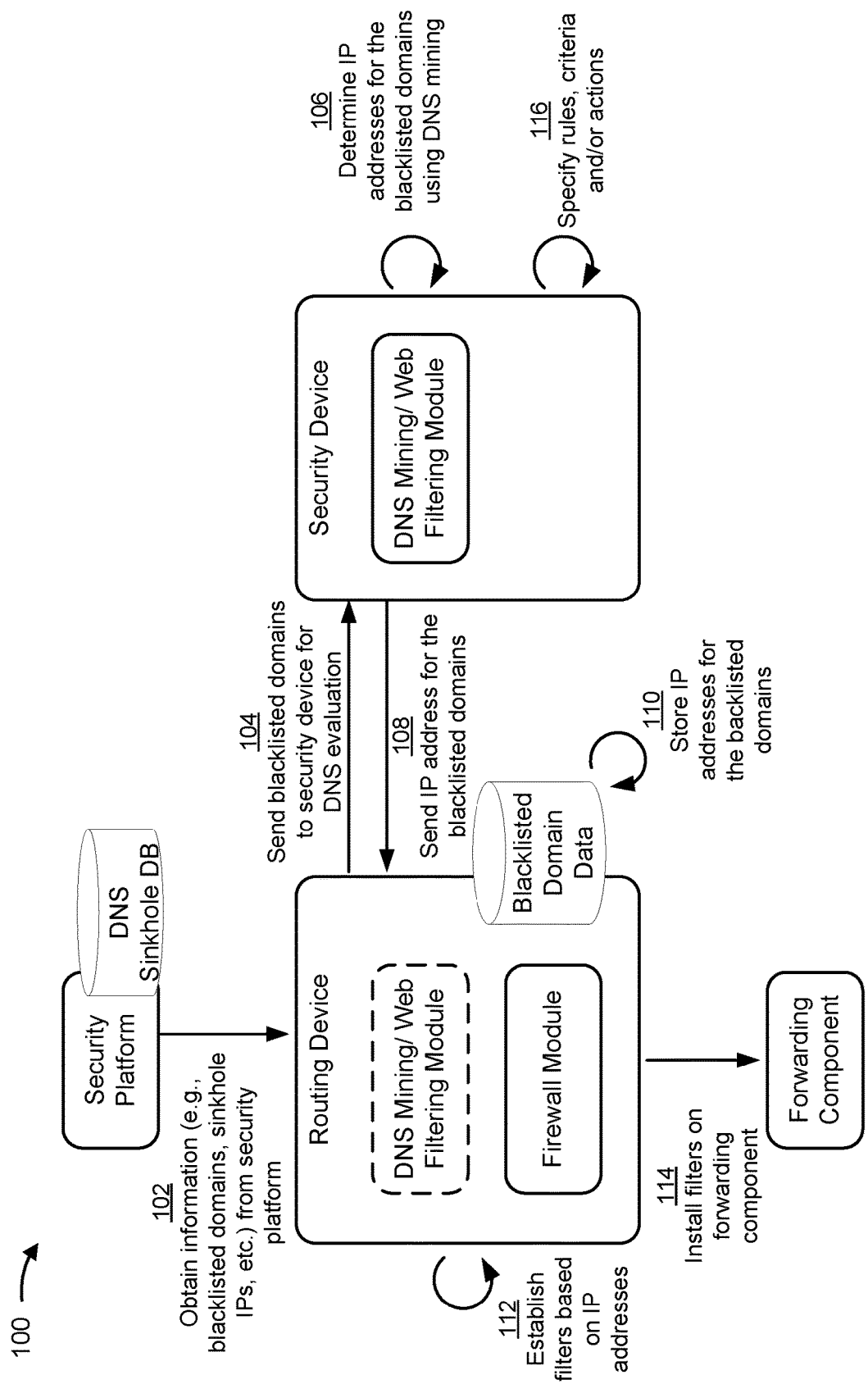
FIGS. 1A-1C are diagrams of an example implementation described herein.

The following detailed description of example implementations refers to the accompanying drawings. The same reference numbers in different drawings may identify the same or similar elements.

Different types of malicious attacks may occur in a network. For example, in some cases, a user may be directed to an attacker's website and unintentionally download malicious content from the website. In other cases, an attacker may bombard a service provider's resources and consume excessive amounts of bandwidth. Network or cloud-based firewall devices aimed at preventing malicious attacks may implement Domain Name System (DNS) sinkhole functionality, in which suspicious traffic, either received from or destined to suspicious resources, may be redirected to a sinkhole server for further analysis. Intelligent attackers, however, have devised methods of bypassing the DNS sinkhole functionality being implemented by the firewall devices when carrying out malicious attacks. Further, in some cases, attackers may intentionally bombard the sinkhole servers with traffic in attacks aimed at consuming bandwidth and overloading the sinkhole servers, which interferes with the sinkhole server's ability to perform traffic analytics.

Some implementations described herein include security devices configured to block, detect, and/or prevent malicious traffic in a network. The security devices may be implemented as a network device (e.g., a routing device, and/or the like) and/or a device attached to a network device (e.g., a physical interface card of a routing device, and/or the like).

In some implementations, the security devices described herein may block malicious traffic in a network. For example, a country (e.g., the United States, the United Kingdom, and/or the like), organization, or a customer may specify a list of blacklisted domains, for which the country or the customer desires to prevent users from accessing. As an example, the blacklisted domains may be associated with an attacker device or an attacker's website. In some implementations, the security devices described herein are configured to proactively perform DNS mining techniques to resolve network addresses for devices hosting the blacklisted domains. The security devices may utilize match criteria included in match-based filters and/or rules to block traffic destined to the resolved network addresses. For example, the security devices may block traffic destined to network addresses associated with webservers hosting the blacklisted domains, and redirect the traffic towards a sinkhole server. In this way, network security may be improved as malicious traffic and/or access to malicious content is more efficiently blocked. In this way, traffic from attackers that bypass DNS sinkhole functionality may be blocked, logged, and/or prevented from accessing an intended destination.

In some implementations, the security devices described herein may detect malicious traffic in a network and/or prevent the malicious traffic from reaching backend devices (e.g., servers, sinkhole servers, etc.) in the network. For example, a security device described herein may receive a DNS request, determine that the DNS request is associated with a possible attacker, and respond to the DNS request with a DNS response that includes a time-to-live value set to zero. Setting the time-to-live value to zero in the DNS response prevents the DNS response from being cached by the possible attacker. In this way, the possible attacker may be forced to send additional DNS requests to try to access a device in the network. The subsequent, additional DNS requests received from the same source network address may be logged and investigated. Where the count of the DNS requests satisfies a threshold, the source device may be deemed to be an attacker device, and the security device may notify a cloud-based security platform so that the attacker device may be globally blocked. In this way, security across one or more networks may be improved as attackers may be elegantly identified and prevented from reaching backend devices in the one or more networks.

Figure 1B:
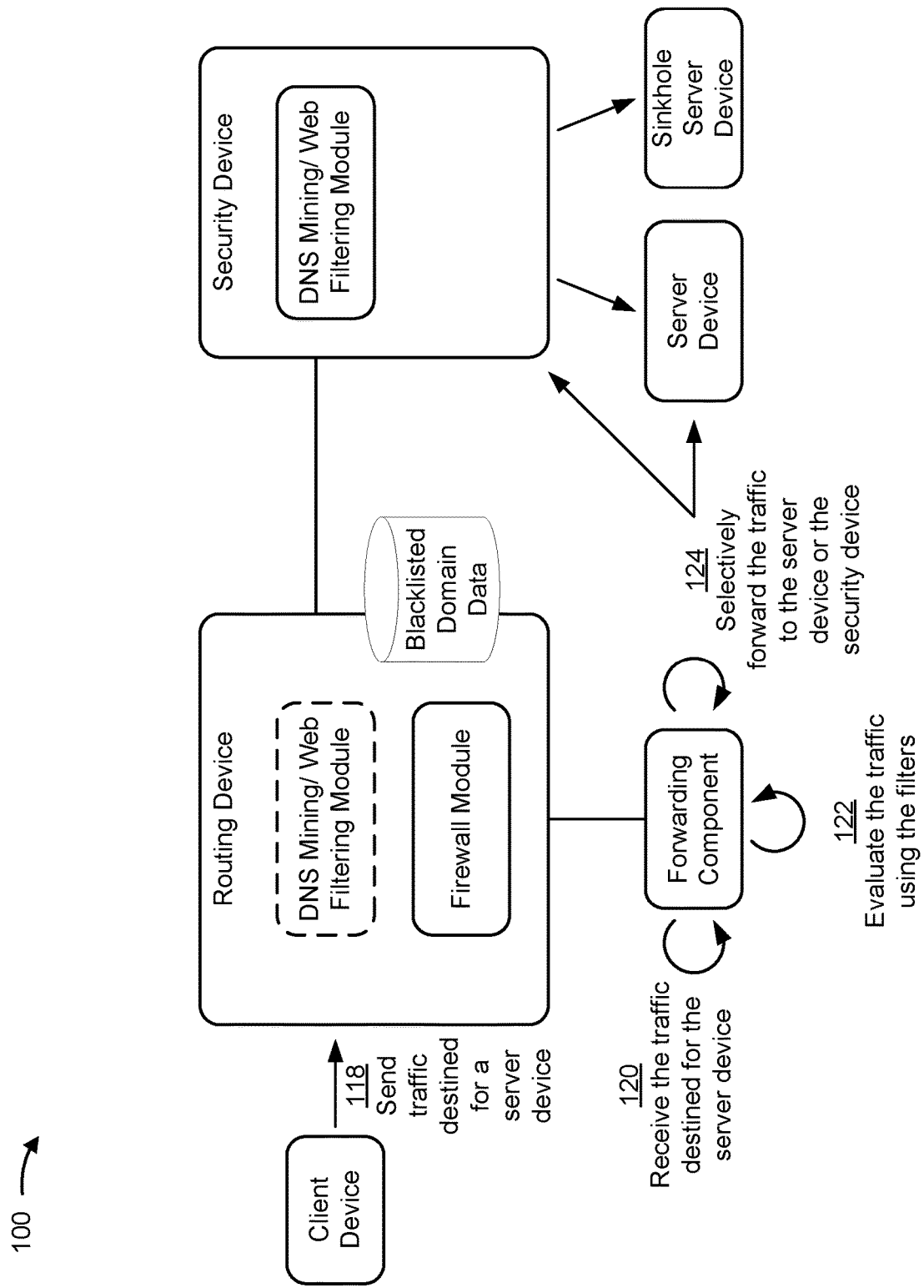
Figure 1C:
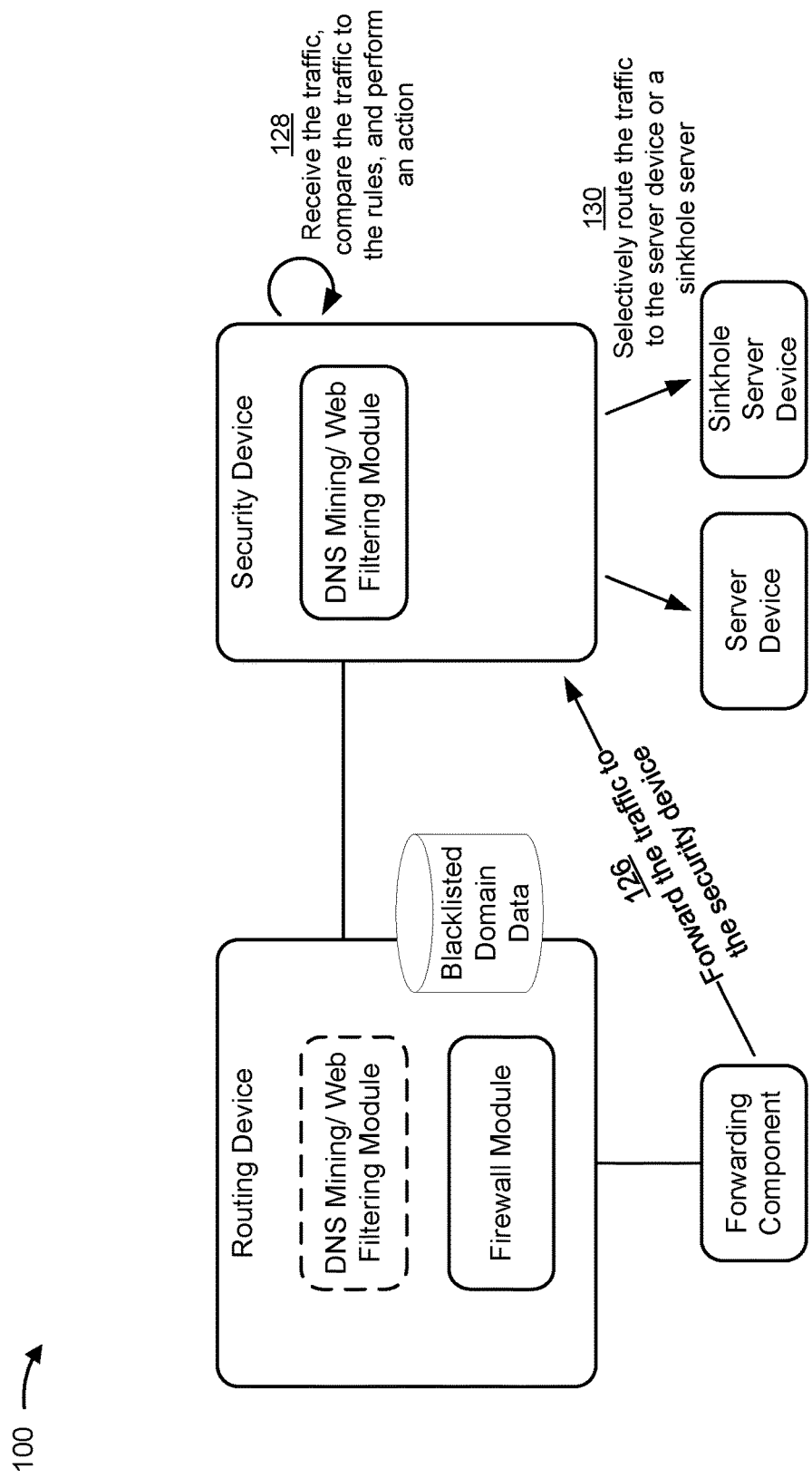

FIGS. 1A-1C are diagrams of an example implementation 100 described herein. As shown in FIGS. 1A-1C, example implementation 100 may include a security platform including a DNS sinkhole data structure, a routing device, a forwarding component, a security device, a client device, a server device, and/or a sinkhole server device. The routing device and/or the security device may, alone or combined, include a DNS mining/web filtering module as described herein, by which network addresses associated with blacklisted domains may be resolved, detected (e.g., using filters or rules), and/or blocked. The routing device may, in some implementations, include a firewall module as described herein, by which the forwarding component may be configured or instructed to forward traffic (i.e., packets) to the security device for inspection. The example implementation 100 may be provided in a public or private network provided by a network service provider.

As shown in FIG. 1A, and by reference number 102, the routing device may receive or obtain information from a security platform, including information stored in the DNS sinkhole data structure or database (DB) of the security platform. The security platform may include a local or cloud-based security solution (e.g., a firewall, etc.) configured to detect threats and implement DNS sinkhole functionality. The DNS sinkhole functionality may include, for example, receiving DNS requests, comparing domain names received in the DNS requests to blacklisted domain identifiers stored in the DNS sinkhole data structure, and responding to the DNS requests with a network address of a sinkhole server that is associated with the blacklisted domain identifier. In this way, traffic destined to blacklisted domains may be directed to sinkhole server devices for further logging and inspection. In some implementations, the blacklisted domains may be associated with an attacker or an attacker's website, which a customer (e.g., a country, a network service provider, a network operator, etc.) determines should be blocked. Intelligent hackers and/or malicious attackers may, however, bypass the security platform as described herein. Therefore, in some implementations, the information stored by the security platform may be obtained by the routing device for use in blocking traffic sent by and/or received from attackers that may bypass the security platform.

In some implementations, the information obtained by the routing device may include, for example, a list of blacklisted domain identifiers associated with blacklisted domains, network addresses (i.e., Internet protocol (IP) addresses) for one or more sinkhole servers associated with the blacklisted domain identifiers, network address ranges (i.e., IP ranges) of blacklisted devices, network address prefixes (i.e., IP prefixes) of blacklisted devices, and/or the like. In some implementations, the network addresses for the one or more sinkhole servers associated with the blacklisted domain identifiers include sinkhole server identifiers, which may correspond to IPv4 addresses and/or IPv6 addresses. In some implementations, the routing device may obtain the information from the security platform via downloading, fetching, subscribing to receive a feed from the security platform, streaming the information in real-time or near real-time, receiving push notifications, and/or the like. In some implementations, the security platform exports the information to the routing device, and exports, streams, or otherwise transmits updated information in real-time or periodically.

As further shown in FIG. 1A, and by reference number 104, the routing device may send the information obtained from the security platform to the security device. In some implementations, the routing device sends the blacklisted domain identifiers to the security device for DNS evaluation or mining, whereby the security device may proactively determine network addresses associated with devices hosting the blacklisted domains. For example, in some implementations, the security device may obtain the blacklisted domain identifiers, and implement DNS crawling and/or DNS snooping techniques by which the security device collects DNS data associated with the blacklisted domain identifiers. In this way, the security device may determine or resolve the network addresses of and/or associated with the blacklisted domains. In this way, traffic from attackers that bypass the DNS sinkhole functionality implemented by the security platform (e.g., traffic that is destined for network addresses of devices hosting the blacklisted domains) may be blocked and/or redirected to a sinkhole server despite having bypassed the security platform.

As further shown in FIG. 1A, and by reference number 106, the security device may determine the network addresses associated with the blacklisted domains using DNS mining techniques (e.g., DNS crawling, DNS snooping, etc.). For example, and, in some implementations, the security device may determine the network addresses associated with the blacklisted domains using a DNS crawling technique. In this regard, the security device may generate DNS requests including the blacklisted domain identifiers, send the DNS requests to a DNS server, receive, from the DNS server, responses to the DNS requests, and cache the network addresses included in the responses to the DNS requests. The security device may proactively perform DNS resolution for the blacklisted domains, in some implementations, periodically or according to a schedule. For example, the security device may generate and send DNS requests for blacklisted domains in the list of blacklisted domains every second (e.g., 50 requests per second, 20 requests per second, etc.), every 10 seconds (e.g., 500 requests per 10 seconds, 200 requests per 10 seconds, etc.), and/or the like.

As another example, and, in some implementations, the security device may determine the network addresses associated with the blacklisted domains using a DNS snooping technique. In this regard, the security device may intercept (e.g., snoop) DNS messages being exchanged by or between a DNS resolver device and a DNS server device. The DNS messages may include one or more packets that indicate or include the network addresses of devices hosting the plurality of blacklisted domains. The security device may cache the network addresses included in the intercepted DNS messages. In this way, the security device may resolve IPv4 and IPv6 network addresses associated with a given blacklisted domain for inclusion in a data structure (e.g., a blacklisted domain data structure) that is assessible to and/or stored by the security device and/or the routing device, by which the security device and/or the routing device may filter and/or block users from accessing devices hosting the blacklisted domains and/or malicious content available from the blacklisted domains. In some implementations, a single blacklisted domain identifier may be resolved to and/or associated with multiple network addresses. The multiple network addresses may include one or more IPv4 network addresses and/or one or more IPv6 network addresses.

As further shown in FIG. 1A, and by reference number 108, the security device may send the network addresses for the blacklisted domains to the routing device. The network addresses for the blacklisted domains may be used in filtering and/or redirecting traffic destined for the blacklisted domains. As shown in FIG. 1A, and by reference number 110, the routing device may store, as blacklisted domain data, the resolved network addresses associated with the blacklisted domains in a data structure. The routing device may collect, aggregate, store, and/or build the data structure containing information associated with the blacklisted domains and/or devices hosting the blacklisted domains obtained from the security platform. In some implementations, the data structure includes the resolved network addresses associated with the blacklisted domains for use in filtering and/or blocking traffic destined for the blacklisted domains. In some implementations, the data stored by the routing device may additionally include the blacklisted domain identifiers obtained from the security platform, the network addresses associated with the blacklisted domain identifiers as resolved by the security device, the list of sinkhole server device identifiers (e.g., sinkhole IPv4 addresses, sinkhole IPv6 addresses, etc.) associated with the blacklisted domain identifiers obtained from the security platform, suspect source network addresses obtained from the security platform, suspect source network address prefixes obtained from the security platform, and/or the like.

As further shown in FIG. 1A, and by reference number 112, the security device may establish filters (e.g., traffic filters) based on the resolved network addresses associated with the blacklisted domain identifiers and/or other information stored by the routing device. In some implementations, the firewall module of the routing device may establish and install the filters on the forwarding component as shown by reference number 114, by which the forwarding component may take specific actions based on the incoming traffic and/or information contained in packet headers of the incoming traffic. For example, the forwarding component may drop the traffic, forward the traffic, log the traffic, and/or the like based on the filters installed by the firewall module of the routing device. In some implementations, the forwarding component may perform actions based on source information and/or destination information contained in the packet headers of incoming traffic, and forward the traffic to the security device for inspection. For example, the forwarding component may forward packets having a suspect source network address, a suspect source network address prefix, and/or the like to the security device for inspection. As another example, the forwarding component may forward packets having a destination network address associated with a device hosting a blacklisted domain to the security device for inspection.

As further shown in FIG. 1A, and by reference number 116, the security device may generate, create, establish, specify, or otherwise provide a set of filters or rules, including match criteria (e.g., match-based criteria) and/or actions to perform based on satisfaction of the match criteria. For example, the rules may be used in filtering incoming traffic, based on the source or destination network addresses contained in the packet headers of the incoming traffic, in forward and reverse directions for identifying and/or blocking traffic received from and/or destined to blacklisted domains. As an example, the rules may filter the incoming traffic based on comparing a source network address and/or a destination network address of incoming packets to information stored or contained in the data structure (e.g., the blacklisted domains, the resolved network addresses of devices hosting the blacklisted domains, etc.), and perform actions based on a result of the comparison.

In some implementations, where incoming traffic includes a source network address and/or a destination network address that matches a network address contained in the data structure, the traffic may be redirected to a sinkhole server. In some implementations, multiple sinkhole servers are associated with a blacklisted domain. In some implementations, where the source or destination network address for incoming traffic matches a network address associated with a blacklisted domain, the security device may perform a lookup in the data structure and obtain the sinkhole server identifiers associated with the blacklisted domain. The security device may select a sinkhole server to which the traffic may be redirected. In some implementations, the security device may do an HTTP redirect of the traffic (e.g., for HTTP or HTTPS traffic), or a Network Address Translation (NAT) of the traffic (e.g., for non-HTTP and/or non-HTTPS traffic), as described herein.

As shown in FIG. 1B, and by reference number 118, the routing device may receive traffic from a client device. In some implementations, the traffic may be L4-L7 traffic (e.g., HTTP traffic, HTTPS traffic, non-HTTP traffic etc.) that includes a network address and has bypassed the security platform (FIG. 1A). In some implementations, the traffic may not have bypassed the security platform. The routing device and/or the security device are configured to inspect and/or filter the traffic based on the source network address, the source port identifier, the destination network address, and/or the destination port identifier information contained in packet headers of the traffic. In some implementations, the traffic may be destined for a server device, as determined based on examining the routing information contained in the packet headers associated with the traffic. The server device may or may not correspond to a server device hosting a blacklisted domain.

As further shown in FIG. 1B, and by reference number 120, the traffic may be received by the forwarding component. In some implementations, the forwarding component may be incorporated within the routing device. As shown in FIG. 1B, and by reference number 122, the forwarding component may evaluate the traffic using the filters installed at the forwarding component by the firewall module. In some implementations, the filters are based on comparing the source network address, the source port identifier, the destination network address, or the destination port identifier and information contained in the data structure. For example, where the destination network address of an incoming packet matches a resolved network address corresponding to a blacklisted domain identifier stored in the data structure, the forwarding component may forward the traffic to the security device for further evaluation and/or inspection. Similarly, where the source network address of the incoming packet matches a source network address or includes a source prefix that matches a source prefix stored in the data structure, the forwarding component may forward the traffic to the security device for further inspection. Further, in some implementations, where the source and/or destination network addresses of the incoming packets do not correspond to any of the network addresses stored in the data structure, the forwarding component may allow the traffic and forward the traffic towards the server device.

As further shown in FIG. 1B, and by reference number 124, the forwarding component may selectively forward the traffic to the server device or the security device based on a result of evaluating the traffic using the filters. As described above, where the source network address, the destination network address, the source identifier (e.g., a source port identifier), and/or the destination identifier (e.g., a destination port identifier) of the incoming traffic matches a network address or an identifier stored in the data structure, the traffic may be forwarded to the security device for further inspection. Additionally, or alternatively, where the source network address, the destination network address, the source identifier, and/or the destination identifier of the incoming traffic do not match any of the network addresses and/or identifiers stored in the data structure, the traffic may be allowed and forwarded towards the server device.

As shown in FIG. 1C, and by reference number 126, the forwarding component may forward the traffic to the security device. In this case, for example, the header information for the traffic received by the forwarding component may have corresponded to information contained in the data structure and, thus, is to receive further inspection, evaluation, and/or actions provided by the security device. Accordingly, the forwarding component may selectively forward the traffic to the security device, for example, in instances where the source network address, the destination network address, the source identifier, and/or the destination identifier of the incoming traffic match a network address and/or an identifier stored in the data structure.

As further shown in FIG. 1C, and by reference number 128, the security device may receive the traffic from the forwarding component and compare the source network address, the destination network address, the source identifier, and/or the destination identifier of the traffic to the information associated with the blacklisted domain identifiers as stored in the data structure. In this way, the security device may evaluate the source and/or destination network addresses and/or the source and/or destination identifiers according to predefined rules or criteria, and perform an action based on the rules and/or satisfaction of the criteria. The criteria to which the security device analyzes incoming traffic for determining matches to blacklisted domains and/or network addresses of devices hosting the blacklisted domains may include, for example, the list of network addresses corresponding to the blacklisted domains, source identifiers, destination identifiers, and/or the like, contained in the data structure. Where a source network address, a destination network address, and/or a source or destination identifier of incoming traffic matches the information stored in the data structure, an action may be performed. Example actions may include, for example, allowing the traffic to be routed to the intended destination server device hosting a webpage, routing (e.g., redirecting) the traffic to a custom network address (e.g., a custom webpage), routing the traffic to a sinkhole server, resetting the connection (e.g., performing a TCP reset on the client device side and/or the server device side), sending a custom response code to the client device, and/or the like.

As further shown in FIG. 1C, and by reference number 130, the security device may selectively route the traffic to the server device or the sinkhole server device based on comparing the data contained in packet headers of the incoming traffic to the information contained in the data structure. For example, in some implementations, the security device may determine that neither the source network address nor destination network address correspond to any of the network addresses contained in the data structure, and the traffic may be allowed. Additionally, or alternatively, where the security device determines that the source network address or the destination network address does correspond to a network address contained in the data structure, the traffic may be parsed to identify a domain name, for example, where the traffic is HTTP or HTTPS traffic. In some implementations, where the domain name matches a blacklisted domain name identifier, the traffic may be redirected to a sinkhole server associated with the blacklisted domain name identifier. In this way, traffic that is destined for a network address of a device hosting a non-blacklisted domain may be allowed, whereas traffic destined for the network address of the device hosting the blacklisted domains may be blocked. For example, in some implementations, the device associated with the network address may host both non-blacklisted and blacklisted domains.

In some implementations, the security device may parse a header of one or more HTTP or HTTPS packets to determine a packet domain identifier, compare the packet domain identifier to the blacklisted domain identifiers stored in the data structure, determine that the packet domain identifier corresponds to a blacklisted domain identifier stored in the data structure, and obtain a plurality of sinkhole server identifiers associated with the blacklisted domain identifiers. The security device may select a sinkhole server identifier from the plurality of sinkhole server identifiers associated with the blacklisted domain identifier and redirect the one or more packets towards a sinkhole server associated with the sinkhole server identifier. In some implementations, the security device performs a HTTP redirect of HTTP or HTTPS traffic, and a destination NAT of non-HTTP and non-HTTPS traffic to redirect the traffic towards the sinkhole server.

In some implementations, the security device may select a sinkhole server based on determining and selecting the sinkhole server that is closest in proximity to the client device from which the traffic originated or was received. For example, the security device may execute a geographic proximity algorithm to select the sinkhole server that is closest to the client device from which the traffic originated or was received. The security device may, using the geographic proximity algorithm, identify a geographic location corresponding to the client device from which the traffic originated or was received, identify multiple geographic locations corresponding to the multiple sinkhole server identifiers, select the sinkhole server identifier associated with the sinkhole server that is geographically closest to the geographic location of the client device, and redirect the traffic to the sinkhole server associated with the selected sinkhole server identifier. In this way, the traffic may be redirected to the sinkhole server that is closest to the source of the traffic, which may be the best equipped to log, report, and/or perform preventative actions on the traffic.

In some implementations, the security device may select the sinkhole server based on a round-robin scheduling process. For example, where the proximity of the sinkhole server and/or the client device may not be determined, the security device may select the sinkhole server in the round-robin manner. In this way, traffic destined for sinkhole servers may be load-balanced in an effort to prevent the sinkhole servers from becoming overloaded. In some implementations, where the traffic is non-HTTP or non-HTTPS and/or where the header parsing fails, the traffic may be directed to the sinkhole server using load-balancing and/or round-robin techniques. In this way, potential malicious attacks may be reduced or prevented.

In this way, the devices described herein may improve security in public and/or private networks, and utilize control plane devices (e.g., routing device, security device, etc.) to perform or implement DNS sinkhole functionality for directing an attacker's traffic, or a suspected attacker's traffic, to a DNS sinkhole server for logging, reporting, and/or causing the performance of preventative actions. In this way, traffic that bypasses traditional firewalls and/or security platforms performing traditional DNS sinkholing functionality may be prevented from reaching devices in the network, and malicious attacks may be blocked, reduced, and/or averted.

As indicated above, FIGS. 1A-1C are provided merely as an example. Other examples are possible and may differ from what was described with regard to FIGS. 1A-1C. For example, although FIGS. 1A-1C may illustrate one component (e.g., the routing device, the security device etc.) as performing one or more actions, it is understood that any of the components may perform the one or more actions. The routing device and/or the security device may include network devices, one or both of which include control plane functionality by which the flow of traffic in the network may be controlled.

FIGS. 2A-2D are diagrams of an example implementation 200 described herein. As shown in FIGS. 2A-2D, example implementation 200 may include a security platform including a DNS sinkhole data structure, a routing device, a forwarding component, a security device, and/or a client device. The routing device and/or the security device may, alone or combined, include a threat evaluation module as described herein, by which DNS data (e.g., blacklisted domain names, network addresses of suspected attackers, threat levels, etc.) may be obtained, evaluated, and used to generate DNS responses having a time-to-live value set to zero. The routing device may, in some implementations, include a firewall module as described herein, by which the forwarding component may be configured or instructed to forward packets to the security device for inspection. The example implementation 200 may be provided in a public or private network provided by a network service provider.

Figure 2A:
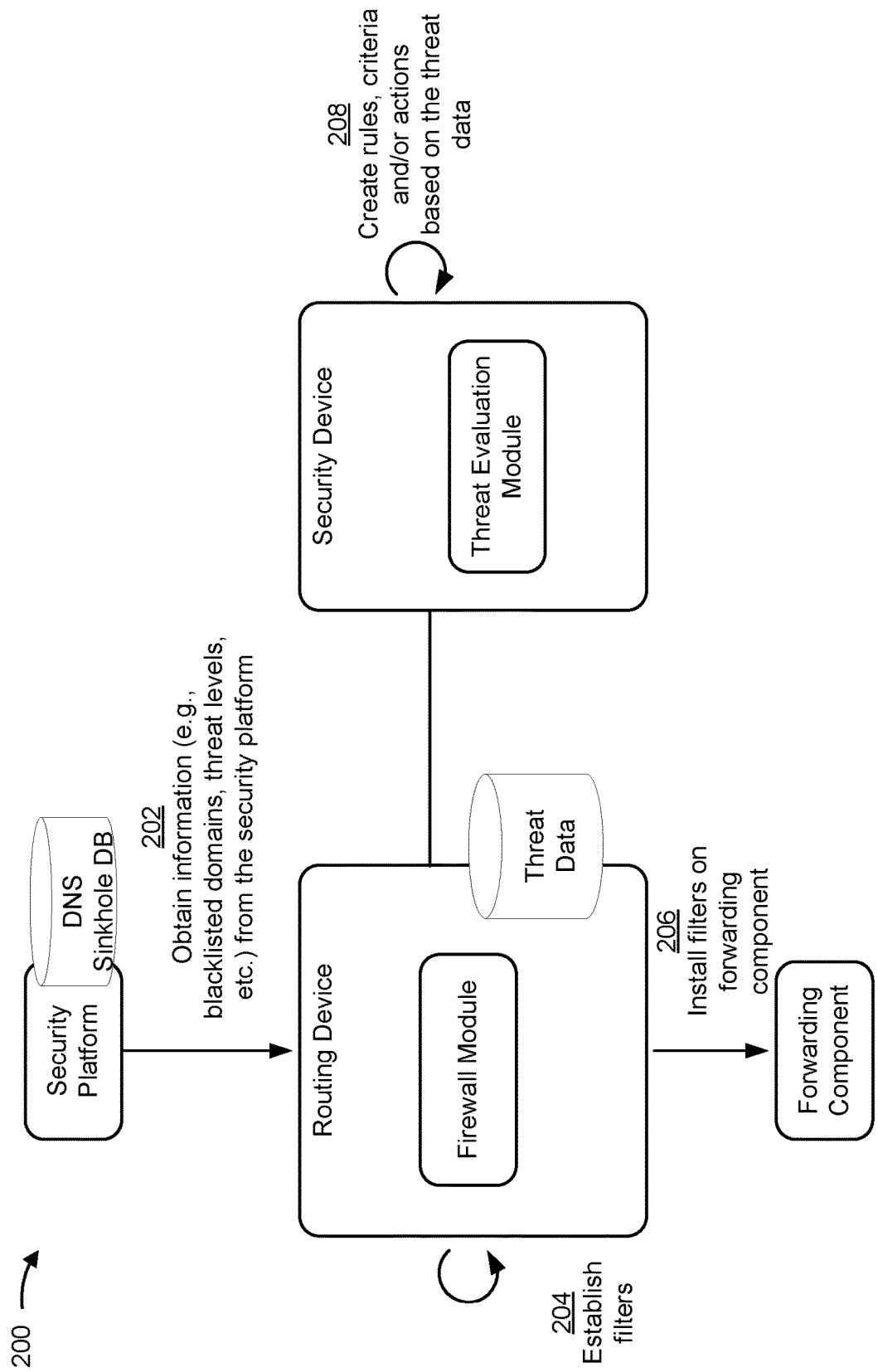
FIGS. 2A-2D are diagrams of an example implementation described herein.

As shown in FIG. 2A, and by reference number 202, the routing device may receive or obtain information from a security platform, including information stored in the DNS sinkhole data structure or database. As described above, the security platform may include a local or cloud-based security solution (e.g., including a firewall, etc.) configured to detect threats and implement DNS sinkhole functionality. In some implementations, aspects relating to performing DNS sinkhole functionality may be implemented by the routing device and/or the security device using information received from the security platform.

In some implementations, the information obtained from the security platform may include, without limitation, a list of blacklisted domains (e.g., identified using blacklisted domain identifiers), a list of network address ranges or prefixes associated with a possible or suspected attacker (e.g., suspect IPv4 or IPv6 addresses, ranges, or prefixes), a threat level associated with the blacklisted domain identifiers and/or the network address ranges or prefixes, one or more sinkhole server identifiers (e.g., sinkhole network addresses) to which traffic may be redirected if received from and/or destined to one or more of the blacklisted domain identifiers and/or the network address ranges or prefixes, and/or the like. The information may be stored (e.g., as threat data) in a data structure of and/or associated with the routing device and/or the security device.

As further shown in FIG. 2A, and by reference number 204, the routing device, using the firewall module, may establish filters for incoming traffic. The filters may be established based on the type of traffic and/or the source or destination of the traffic as specified in packet headers of the traffic. For example, the filters may be used to forward all DNS traffic destined for Port 53 to the security device. As another example, the filters may be used to forward traffic having a source identifier, a source network address, a destination identifier, or a destination network address that matches a blacklisted domain identifier, a network address, and/or a source or destination identifier included in the data structure to the security device. As shown in FIG. 2A, and by reference number 206, the filters may be installed on the forwarding component. In this way, traffic received by the routing device from a suspected attacker may be forwarded to the security device for further inspection and evaluation.

As further shown in FIG. 2A, and by reference number 208, the security device may create, establish, provide and/or otherwise be configured with a set of rules including match criteria and actions to be performed based on satisfaction of the match criteria. The rules may be used to detect and/or prevent possible attacks. For example, the rules may instruct the security device to use, as the match criteria, the information contained in the data structure for use in filtering traffic and performing actions based on the traffic. In some implementations, the security device may use, as the match criteria, the list of blacklisted domain identifiers, the list of network addresses, ranges, prefixes, and/or the like, for comparing or matching to domain identifiers and/or network addresses of the incoming traffic as determined based on examining the packet headers of the incoming traffic. The domain identifiers and/or network addresses of the incoming traffic may be compared to the blacklisted domain identifiers and/or the network addresses obtained from the security platform and stored in the data structure for use in detecting traffic that has a source identifier, a source network address, a destination identifier, or a destination network address that matches or corresponds to a blacklisted or suspicious entity (e.g., a device associated with a blacklisted domain identifier and/or a suspect network address, prefix, or range).

In some implementations, the rules implemented by the security device may further include a threshold, whereby a threat level associated with the blacklisted domain identifiers and/or network addresses, ranges, and/or prefixed stored in the data structure may be obtained and compared to the threshold. The security device may perform one or more actions based on determining whether the information associated with incoming traffic (e.g., the packet header information) matches or corresponds to a blacklisted domain identifier and/or a network address of a possible attacker stored in the data structure and/or whether the threat level associated with the blacklisted domain identifier and/or the network address of the possible attacker satisfies the threshold. Example actions include, for example, generating a DNS response and sending the DNS response to the client device from which the traffic is received. The DNS response may include, for example, a time-to-live value set to zero. In this way, the client device may be unable and/or prevented from caching the DNS response. By virtue of being prevented from caching the DNS response, the client device may be prevented from accessing the intended destination. In this way, the client device, which may be a possible attacker, may be prevented from bombarding network devices (e.g., servers, sinkhole servers, etc.) with requests and inhibiting the functioning of the network devices.

For example, the time-to-live value may specify the lifespan associated with DNS information (e.g., the network address of the requested domain) received from the DNS server. Typically, a client device caches the DNS information and uses the stored information to resolve DNS requests prior to the expiration of the record as specified by the time-to-live. Setting the time-to-live value to zero as described herein enables the DNS information to automatically expire upon reaching the client device, and prevents the client device from caching the DNS information. In this way, the client device may be forced to initiate new DNS requests in an attempt to reach a network device. The security device may monitor a count of the DNS request received from client devices to determine whether the client device is associated with an attacker, in some instances, based on the count satisfying a threshold.

Figure 2B:
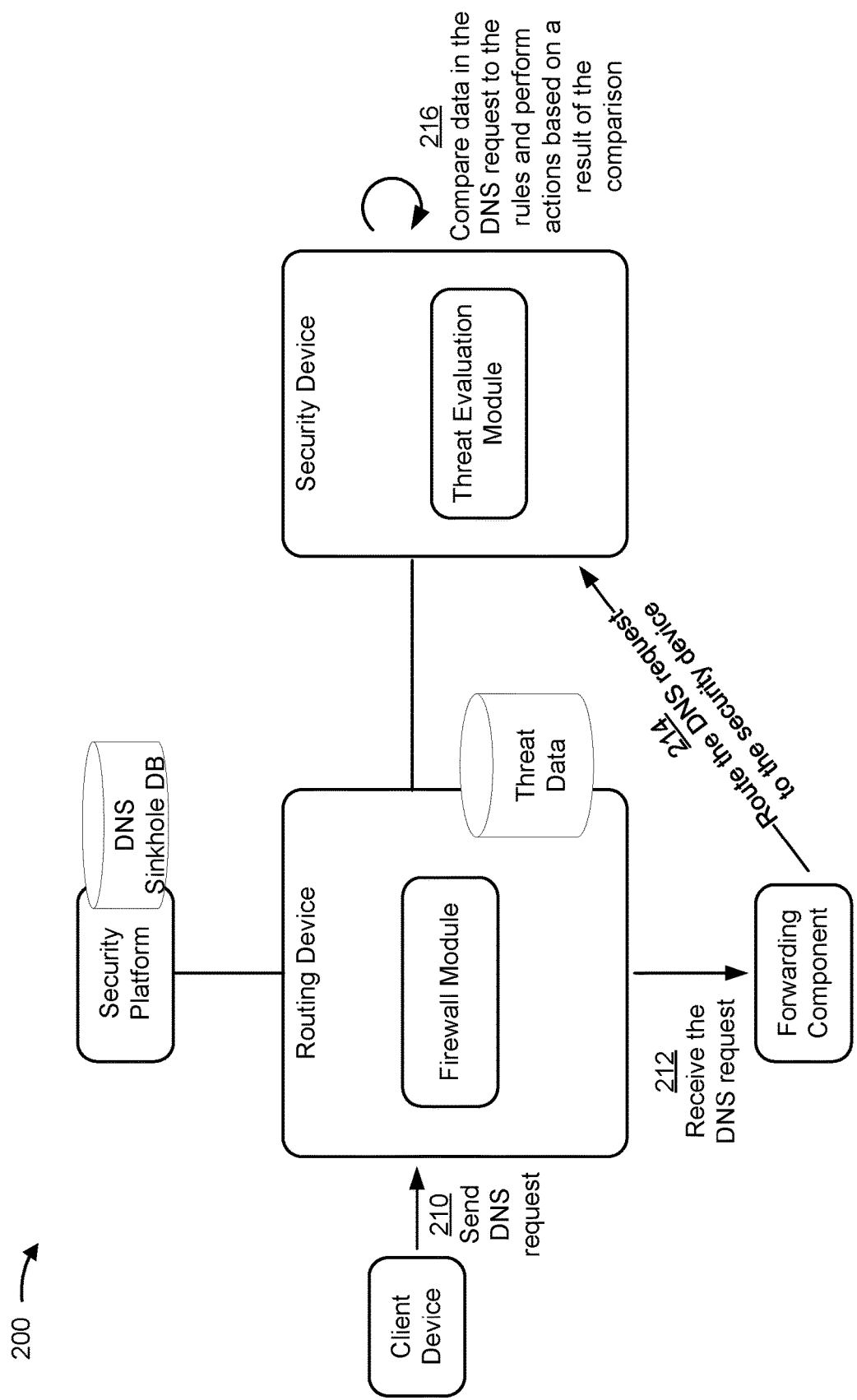

As shown in FIG. 2B, and by reference number 210, the client device may send a DNS request to the routing device. The DNS request may include a destination domain associated with a destination domain identifier and a source network address corresponding to the client device from which the DNS request was received. As shown by reference number 212, the forwarding component may receive the DNS request. For example, the DNS request may be destined for and/or received by Port 53 of the routing device, whereby, as shown by reference number 214, the forwarding component may apply the previously installed filter and forward the DNS request to the security device for further evaluation and/or performance of one or more actions.

As further shown in FIG. 2B, and by reference number 216, the security device may compare the data or information contained in the DNS request to the information for blacklisted and/or suspect domains or devices stored in the data structure, for example, based on the rules implemented by the security device. The security device may perform one or more actions based on a result of the comparison of the information contained in the DNS request to the information stored in the data structure. In some implementations, the security device compares a domain identifier (e.g., the destination domain identifier) contained or included in the DNS request to the blacklisted domain identifiers stored in the data structure. Additionally, or alternatively, in some implementations, the security device compares a source network address, range, and/or prefix (e.g., corresponding to the client device) contained in the DNS request to the network addresses, ranges, and/or prefixes of suspect devices stored in the data structure. Where the security device detects a match between a domain identifier and a blacklisted domain identifier and/or a source network address, range, and/or prefix and network address, range and/or prefix of a suspect device, the security device may obtain and determine whether the threat level associated with the blacklisted domain identifier and/or the network address, range, and/or prefix satisfies a threshold.

In some implementations, for example, where the domain identifier contained in the DNS request matches a blacklisted domain identifier and the threat level associated with the blacklisted domain satisfies a threshold, the security device may proactively sinkhole all DNS requests destined for the blacklisted domain identifiers. For example, the security device may sinkhole requests by generating and sending a DNS response to the client device, where the DNS response includes a time-to-live value set to zero. For example, where the threat level associated with the blacklisted domain satisfies the threshold, the domain identifier contained in the DNS request matches a blacklisted domain identifier, and a network address, range, or prefix contained in the DNS request matches a network address, range, or prefix of a suspect attacker stored in the data structure, the security device may sinkhole the DNS request. Additionally, or alternatively, where the threat level associated with the blacklisted domain satisfies the threshold, the domain identifier contained in the DNS request matches a blacklisted domain identifier, and the network address, range, or prefix contained in the DNS request does not match a network address, range, or prefix of a suspect attacker stored in the data structure, the security device may still proactively sinkhole the DNS request by generating and sending a DNS response to the client device. The DNS response may include the time-to-live value set to zero and the sinkhole server identifier. In this way, the security device may randomly sinkhole requests received from client devices having non-suspect source network addresses, ranges, or prefixes, where, for example, the requests are destined for blacklisted domains and where, for example, the threat level associated with the blacklisted domains satisfies a threshold.

Figure 2C:
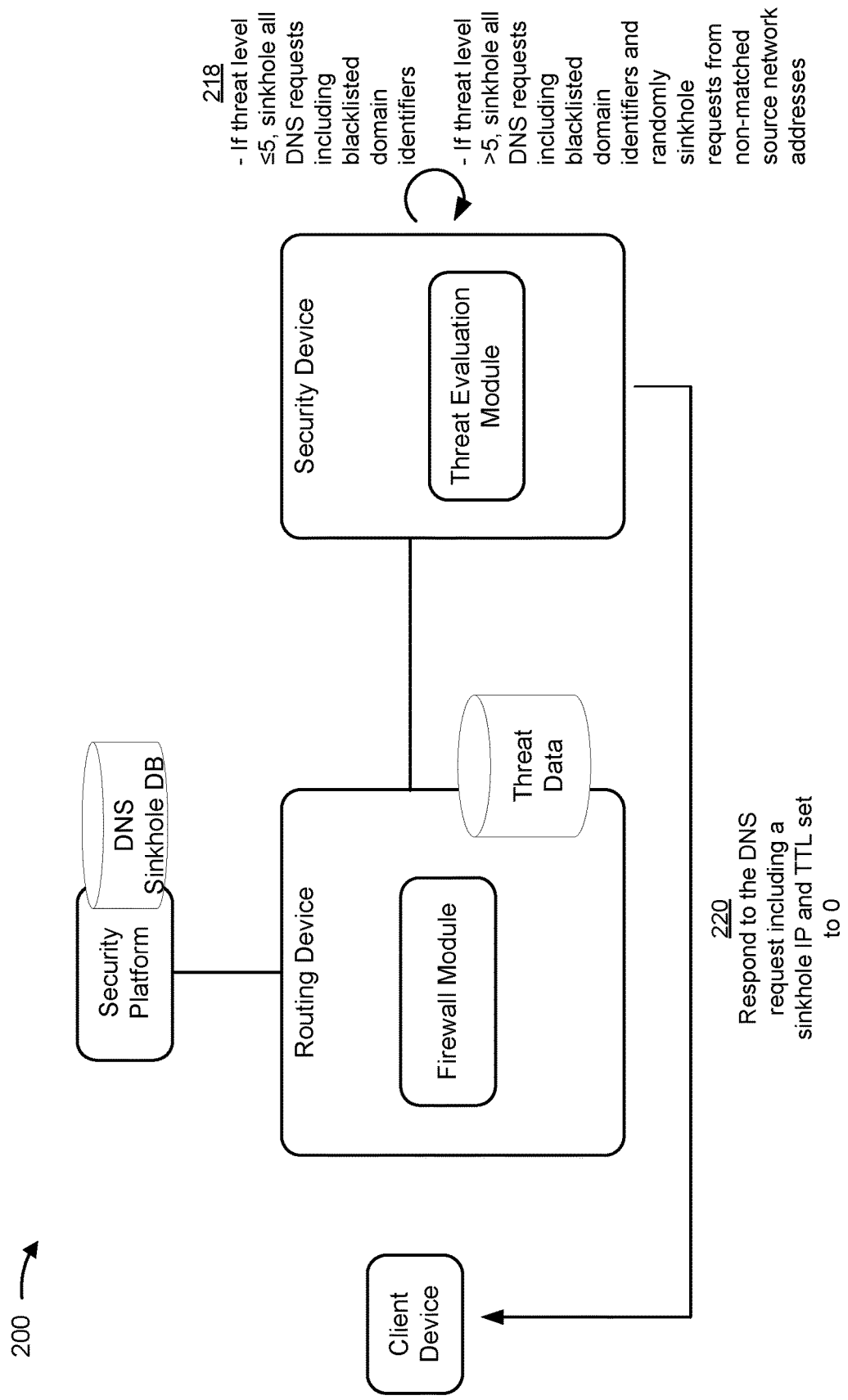

As shown in FIG. 2C, and by reference number 218, where the threshold for the threat level does not satisfy the threshold (e.g., a low threat level between 1-5 on a scale of 1-10), the security device may sinkhole DNS requests destined for blacklisted domain identifiers and a network address (or range or prefix) that matches a network address of a suspect attacker stored in the data structure. When the threshold is low, the security device may determine not to sinkhole DNS requests from a network address that does not match a network address of a suspect attacker stored in the data structure. When sinkholing a request, the security device may obtain a list of sinkhole server identifiers associated with the blacklisted domain identifier and/or the network address of the suspect attacker, select a sinkhole server identifier, generate a DNS response including the sinkhole server identifier, and respond to the DNS request with the DNS response. In some implementations, the DNS response includes a time-to-live value set to zero. In this way, suspicious and/or potentially malicious traffic from the client device is prevented from reaching the intended destination, which increases security in the network.

Additionally, or alternatively, where the threshold for the threat level satisfies the threshold (e.g., a high threat level >5 on the scale of 1-10), and for requests received from source network addresses, ranges, or prefixes that do not correspond to network addresses, ranges, or prefixes stored in the data structure, the security device may obtain a list of sinkhole server identifiers associated with the blacklisted domain identifier, select a sinkhole server identifier, generate a DNS response including the sinkhole server identifier, and respond to the DNS request with the DNS response. In some implementations, the DNS response includes a time-to-live value set to zero. In this way, DNS requests received from random sources, which may arise to being deemed or classified as an attacker as described herein, may be prevented from reaching the devices in the network, and malicious attacks may be prevented. The threat levels may be numeric values or non-numeric values, in some implementations. For illustration purposes only, the threat level 5 was chosen as an example threshold based on a scale of 1-10. Other threat level values and/or threshold values are contemplated.

As shown in FIG. 2C, and by reference number 220, the security device may respond to the DNS request from the client device. The DNS response generated and sent by the security device may include a network address associated with a sinkhole server and include the time-to-live (TTL) value set to zero. In this way, the client device's cache may be invalidated by the zero response time-to-live. In this way, the client device may be prevented from caching the DNS request. The client device may be required to send multiple DNS requests in an attempt to reach an intended destination, and the security device may log and/or count the number of DNS requests received from a given client device in determining whether to deem or classify a client device as a possible attacker.

Figure 2D:
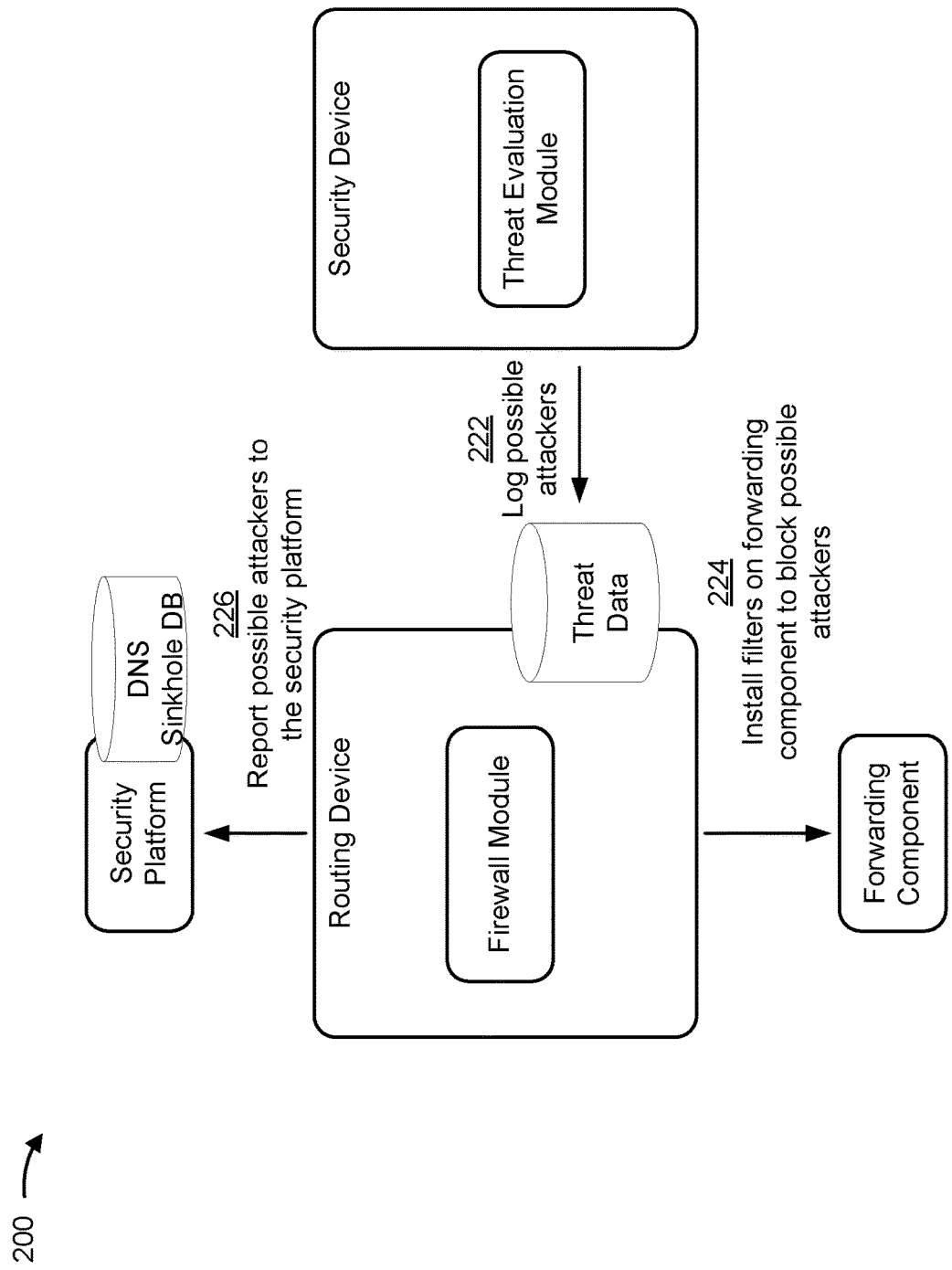

FIG. 2D illustrates various actions which may be performed based on monitoring a count of the number of DNS requests received from a client device, after the client device is sent a DNS response including the time-to-live value set to zero. As shown in FIG. 2D, and by reference number 222, the security device may compile or configure a log of possible attackers based one monitoring the count of the number of requests received from a client device during a period of time. For example, where a client device bombards the routing device with DNS requests, so that the count of the DNS requests satisfies the threshold, the security device may add the source network address of the client device to a list of possible attackers. In this way, the security device may identify or detect possible attackers based on monitoring the count of DNS requests induced by setting the time-to-live values of DNS responses to zero.

As further shown in FIG. 2D, and by reference number 224, one or more filters may be installed on the forwarding component based on the monitoring count of the DNS requests received from the client device. For example, and, in some implementations, where the count of the DNS requests received from the client device satisfies the threshold, the firewall module of the security device may install filters on the forwarding component by which the forwarding component may be instructed to block or drop DNS requests received from the client device. In this way, traffic from the client device, which may be identified as a possible attacker based on the count of DNS requests received by the routing device, may be prevented from being routed and/or traversing through a network and reaching devices in the network.

As further shown in FIG. 2D, and by reference number 226, the routing device may send or report the possible attackers to the security platform. In some implementations, the security platform may include a cloud-based security platform, in some cases, which corresponding to a global security device. For example, the routing device may send or report network addresses associated with client devices deemed to be possible attackers based on monitoring the count of the DNS requests received from the client devices. In some implementations, the network addresses of the client devices satisfying the threshold count of DNS requests may be reported, transmitted, or sent to the security platform. The security platform may build a database (e.g., including a global attacker database), that includes the network addresses of the client devices satisfying the threshold count of DNS requests. The database may be shared with additional global security devices for globally blocking the network addresses. In this way, potential attackers may be blocked on a global level by a security enterprise that owns or operates the security platform. In some implementations, the security platform includes a cloud-based security solution which hosts a global attacker database. The database may be shared with other security devices for globally blocking attackers or potential attackers having network addresses associated with client devices that satisfy the threshold count of DNS requests sent to the routing device.

In this way, generating and sending DNS responses including the time-to-live value set to zero may be used to detect attackers based on logging and/or counting the number of DNS requests received from a given client device, and also prevent attacks by preventing the client device from reaching devices in a network. In this way, the sinkholing of random DNS requests based on the threat level of blacklisted domains or suspect devices in the network also allows a larger volume of traffic to be examined for further detection of possible attacks.

As indicated above, FIGS. 2A-2D are provided merely as an example. Other examples are possible and may differ from what was described with regard to FIGS. 2A-2D. Moreover, while different implementations have been described with respect to FIGS. 1A-1C and FIGS. 2A-2D, some or all of the functions of one of the implementations may be used in the other implementation.

Figure 3:
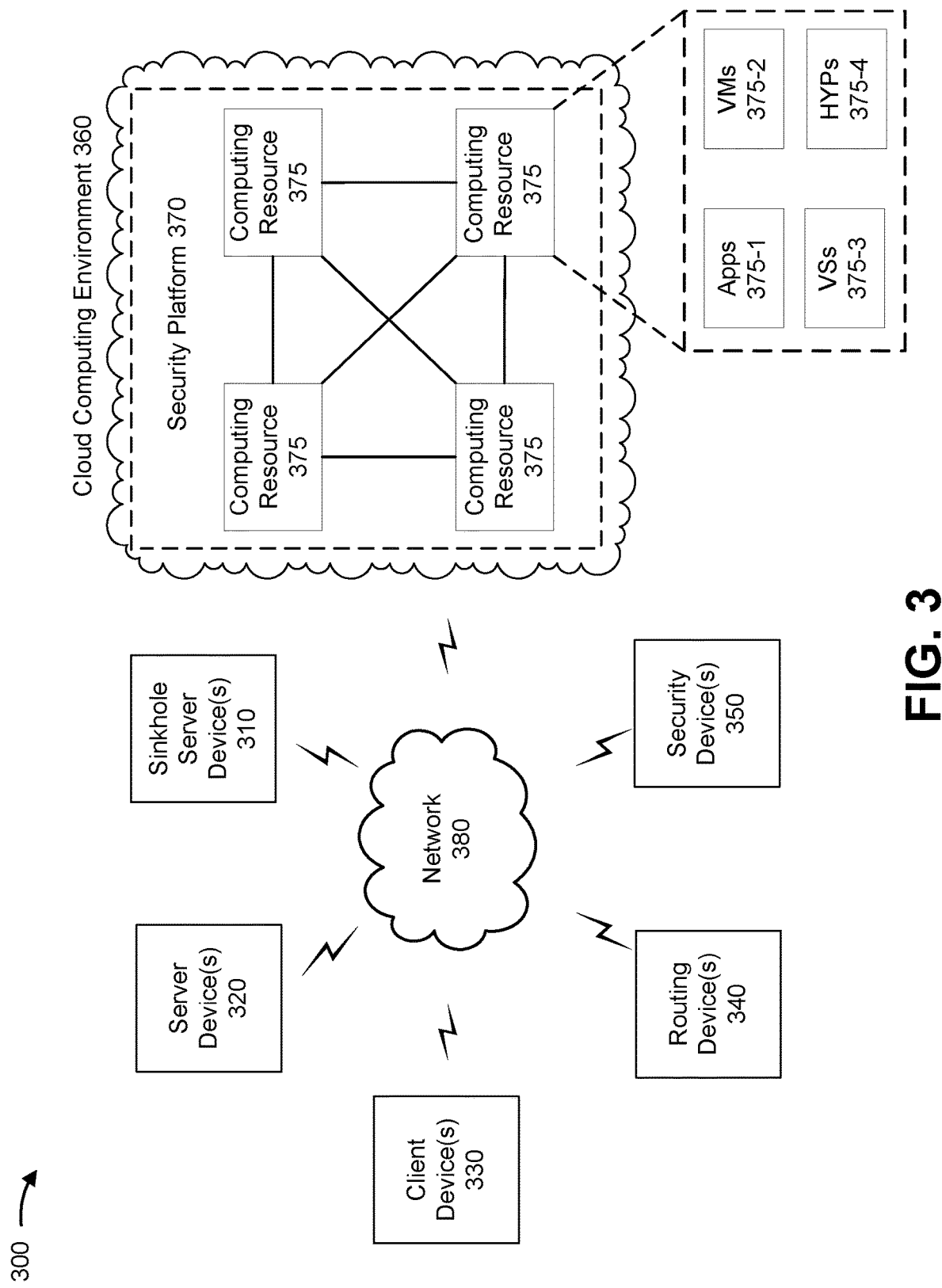
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a sinkhole server device 310, a server device 320, a client device 330, a routing device 340, a security device 350, a cloud computing environment 360, a security platform 370, a computing resource 375, and a network 380, as described herein. Devices of environment 300 may interconnect via wired connections, wireless connections, or a combination of wired and wireless connections.

Sinkhole server device 310 includes one or more devices capable of receiving, generating, storing, processing, and/or providing information associated with blocking, detecting, and/or preventing malicious traffic. For example, sinkhole server device 310 may include a server device or a group of server devices, a workstation computer or a group of workstation computers, a virtual machine (VM) or a group of virtual machines, and/or the like, to which security device 350 may selectively route traffic (e.g., Internet traffic that was destined for server device 320), in order to prevent access to malicious content, and to capture, log, and/or analyze the traffic in order to evaluate and contain threats (e.g., to server device 320).

Server device 320 includes one or more devices capable of storing, processing, and/or transmitting information in a network. In some implementations, server device 320 is a webserver hosting a website. Server device 320 may include a communication interface that allows server device 320 to receive information from and/or transmit information to other devices in environment 300. Server device 320 may include a blacklisted webserver or a non-blacklisted webserver as determined by security device 350 as described herein.

Client device 330 includes one or more devices capable of sending or receiving data (e.g., packets), such as Internet traffic. For example, client device 330 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Client device 330 may send data to server device 320 via routing device 340, and via security device 350, in the form of Internet traffic that is monitored by security platform 370.

Routing device 340 includes one or more network devices (e.g., one or more traffic transfer devices) capable of processing and/or transferring traffic between endpoint devices. For example, routing device 340 may include a router, a firewall, a gateway, a switch, a hub, a bridge, a reverse proxy, a server (e.g., a proxy server), a security device, an intrusion detection device, a load balancer, or a similar device.

Security device 350 includes a network device such as a physical interface card (PIC) having ports providing physical connections to other elements in a network and may receive and send packets. Each physical port may connect to one of many types of transport media, such as an optical fiber or Ethernet cable. A particular PIC and the associated port may be programmed and formatted according to one of several protocols, such as the synchronous optical network (SONET) standard, Ethernet, or Internet Protocol (IP). Security device 350 may be a modular and/or replaceable element of a network device (e.g., routing device 340), and may be hot-swappable, meaning that the security device may be pulled out of its slot and replaced with a different PIC while the network device is operating, without interruption in the operation of the network device. Security device 350 may perform data link layer functions, including communicating with another device using a data link layer protocol, such as Point-to-Point Protocol (PPP). Security device 350 may perform operations on a particular incoming (or outgoing) packet, such as decapsulation and encapsulation, classifying a packet based on service class, internal redirection of packets to other components of a network, management of a flow table, sampling of packets flows, and/or the like. Security device 350 may be configured by a user for specific quality of service (QoS) requirements and may include a firewall.

Cloud computing environment 360 includes an environment that delivers computing as a service, whereby shared resources, services, etc. may be provided to sinkhole server device 310, server device 320, client device 330, routing device 340, security device 350, security platform 370, computing resource 375, and/or the like. Cloud computing environment 360 may provide computation, software, data access, storage, and/or other services that do not require end-user knowledge of a physical location and configuration of a system and/or a device that delivers the services. As shown, cloud computing environment 360 may include security platform 370 and computing resource 375.

Security platform 370 includes a server device or a similar device capable of receiving, generating, storing, processing, and/or providing information to security device 350 for use in blocking, detecting, and/or preventing malicious traffic in a network. For example, security platform 370 may be provided by a network service provider, a network operator, an enterprise, and/or the like, which may monitor traffic (e.g., Internet traffic) globally, for security purposes. In some implementations, as shown, security platform 370 may be hosted in cloud computing environment 360. Notably, while implementations described herein describe security platform 370 as being hosted in cloud computing environment 360, in some implementations, security platform 370 might not be cloud-based (i.e., may be implemented outside of a cloud computing environment 360) or might be partially cloud-based.

Computing resource 375 includes one or more personal computers, workstation computers, server devices, or another type of computation and/or communication device. In some implementations, computing resource 375 may host security platform 370. The cloud resources may include compute instances executing in computing resource 375, storage devices provided in computing resource 375, data transfer devices provided by computing resource 375, etc. In some implementations, computing resource 375 may communicate with other computing resources 375 via wired connections, wireless connections, or a combination of wired and wireless connections.

As further shown in FIG. 3, computing resource 375 may include a group of cloud resources, such as one or more applications ("APPs") 375-1, one or more virtual machines ("VMs") 375-2, virtualized storage ("VSs") 375-3, one or more hypervisors ("HYPs") 375-4, or the like.

Application 375-1 includes one or more software applications that may be provided to or accessed by client device 330, routing device 340, and/or security device 350. Application 375-1 may eliminate a need to install and execute the software applications on client device 330, routing device 340, and/or security device 350. For example, application 375-1 may include software associated with security platform 370 and/or any other software capable of being provided via cloud computing environment 360. In some implementations, one application 375-1 may send/receive information to/from one or more other applications 375-1, via virtual machine 375-2.

Virtual machine 375-2 includes a software implementation of a machine (e.g., a computer) that executes programs like a physical machine. Virtual machine 375-2 may be either a system virtual machine or a process virtual machine, depending upon use and degree of correspondence to any real machine by virtual machine 375-2. A system virtual machine may provide a complete system platform that supports execution of a complete operating system ("OS"). A process virtual machine may execute a single program, and may support a single process. In some implementations, virtual machine 375-2 may execute on behalf of a user (e.g., client device 330, routing device 340, and/or security device 350), and may manage infrastructure of cloud computing environment 360, such as data management, synchronization, or long-duration data transfers.

Virtualized storage 375-3 includes one or more storage systems and/or one or more devices that use virtualization techniques within the storage systems or devices of computing resource 375. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 375-4 provides hardware virtualization techniques that allow multiple operating systems (e.g., "guest operating systems") to execute concurrently on a host computer, such as computing resource 375. Hypervisor 375-4 may present a virtual operating platform to the guest operating systems, and may manage the execution of the guest operating systems. Multiple instances of a variety of operating systems may share virtualized hardware resources.

Network 380 includes one or more wired and/or wireless networks. For example, network 380 may include a communications network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a public network, a private network, an ad hoc network, an intranet, the Internet, a fiber optic-based network, a cloud computing network, or the like, and/or a combination of these or other types of networks.

In some implementations, routing device 340 and/or security device 350 may be physical devices implemented within a housing, such as a chassis. In some implementations, routing device 340 and/or security device 350 may be a virtual device implemented by one or more computer devices of a cloud computing environment or a data center.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4A:
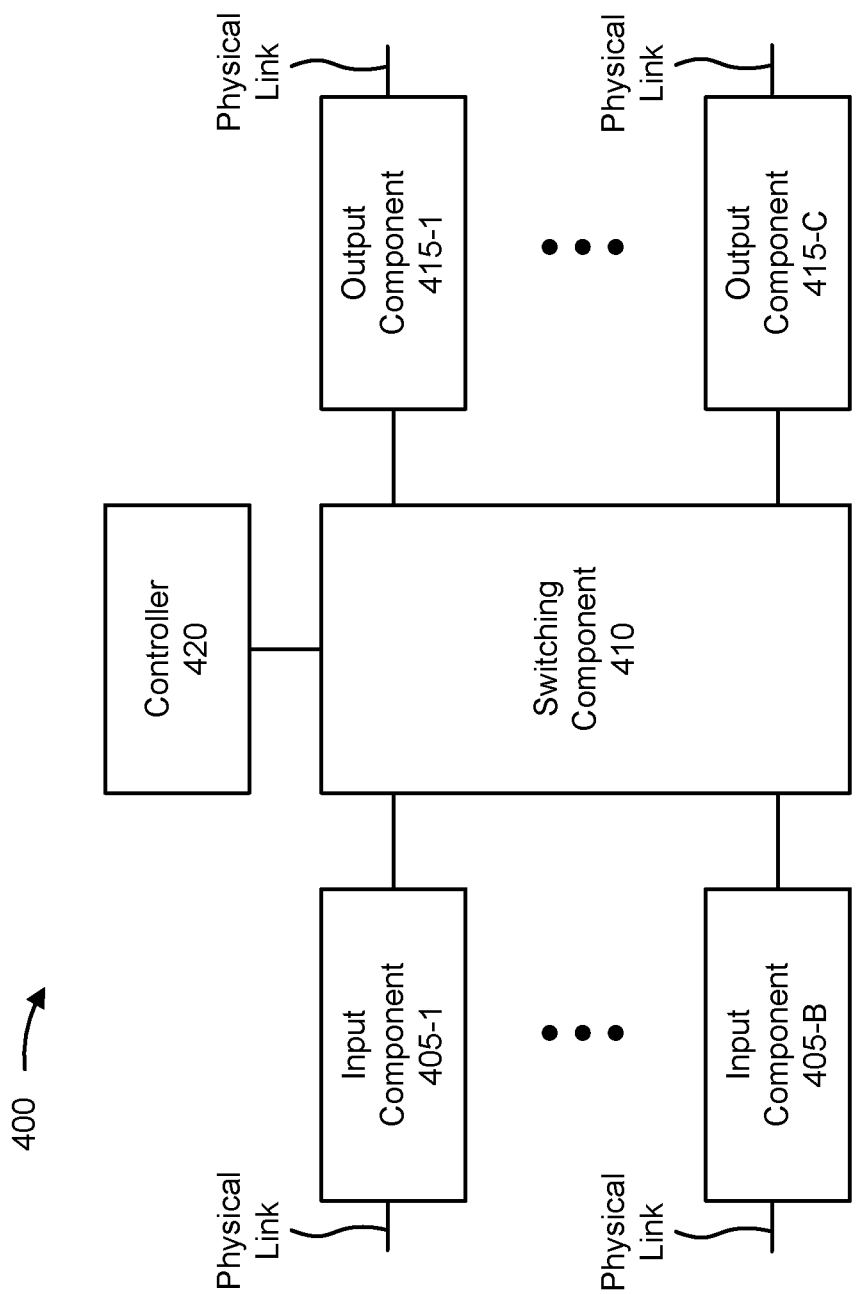
FIGS. 4A-4B are diagrams of example components of one or more devices of FIG. 3.
Figure 4B:
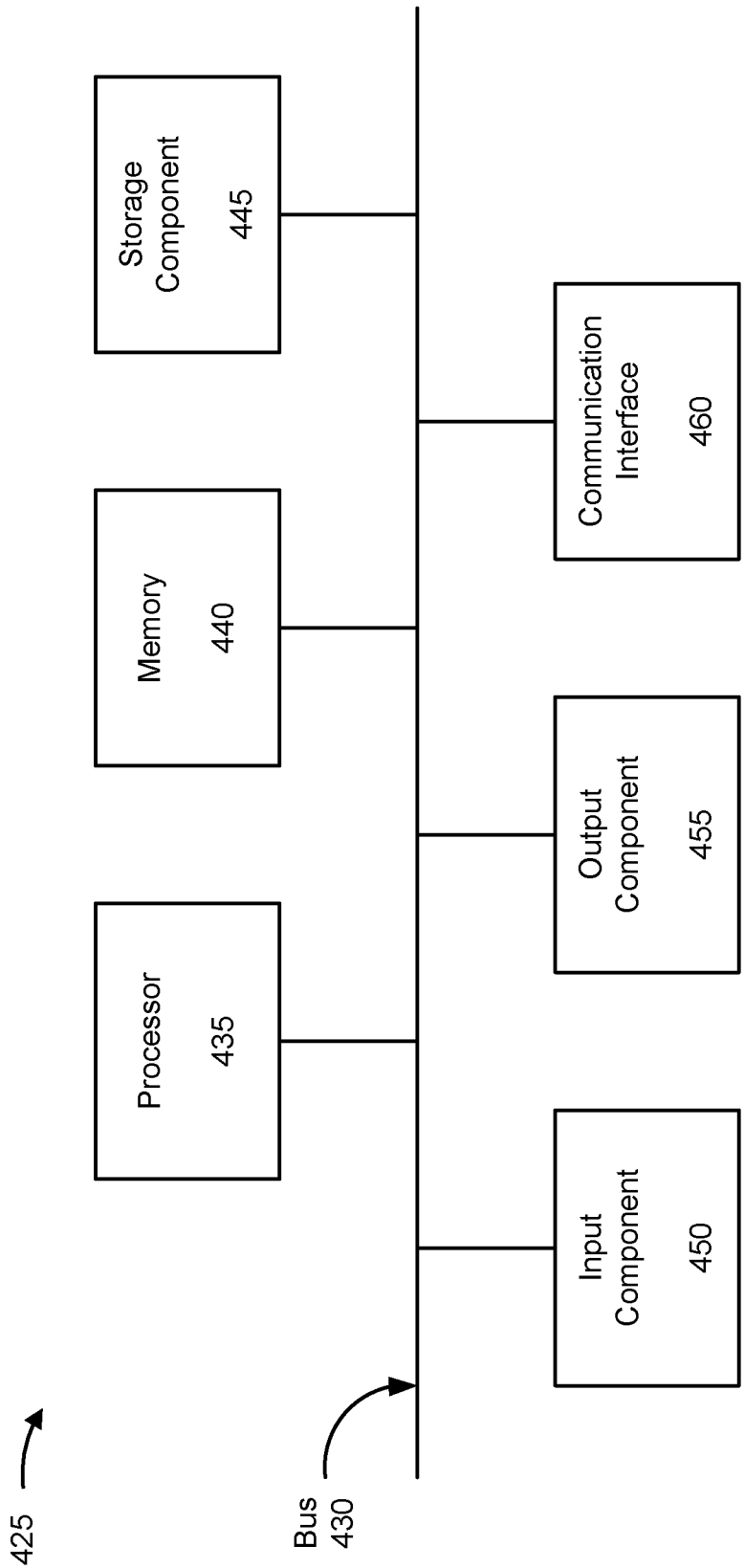

FIGS. 4A-4B are diagrams of example components of devices 400 and 425. Devices 400 and 425 may correspond to sinkhole server device 310, server device 320, client device 330, routing device 340, security device 350, security platform 370, and/or computing resource 375. In some implementations, sinkhole server device 310, server device 320, client device 330, routing device 340, security device 350, security platform 370, and/or computing resource 375 may include one or more devices 400, one or more devices 425, one or more components of device 400, and/or one or more components of device 425. As shown in FIG. 4A, device 400 may include an input component 405, a switching component 410, an output component 415, and a controller 420. As shown in FIG. 4B, device 425 may include a bus 430, a processor 435, a memory 440, a storage component 445, an input component 450, an output component 455, and a communication interface 460.

FIG. 4A is a diagram of example components of a device 400. Device 400 may correspond to routing device 340 and/or security device 350. In some implementations, routing device 340 and/or security device 350 may include one or more devices 400 and/or one or more components of device 400. As shown in FIG. 4A, device 400 may include one or more input components 405-1 through 405-B (B≥1) (hereinafter referred to collectively as input components 405, and individually as input component 405), a switching component 410, one or more output components 415-1 through 415-C (C≥1) (hereinafter referred to collectively as output components 415, and individually as output component 415), and a controller 420.

Input component 405 may be points of attachment for physical links and may be points of entry for incoming traffic, such as packets. Input component 405 may process incoming traffic, such as by performing data link layer encapsulation or decapsulation. In some implementations, input component 405 may send and/or receive packets. In some implementations, input component 405 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 405.

Switching component 410 may interconnect input components 405 with output components 415. In some implementations, switching component 410 may be implemented via one or more crossbars, via busses, and/or with shared memories. The shared memories may act as temporary buffers to store packets from input components 405 before the packets are eventually scheduled for delivery to output components 415. In some implementations, switching component 410 may enable input components 405, output components 415, and/or controller 420 to communicate.

Output component 415 may store packets and may schedule packets for transmission on output physical links. Output component 415 may support data link layer encapsulation or decapsulation, and/or a variety of higher-level protocols. In some implementations, output component 415 may send packets and/or receive packets. In some implementations, output component 415 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 415. In some implementations, input component 405 and output component 415 may be implemented by the same set of components (e.g., and input/output component may be a combination of input component 405 and output component 415).

Controller 420 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor. The processor is implemented in hardware, firmware, or a combination of hardware and software. In some implementations, controller 420 may include one or more processors that can be programmed to perform a function.

In some implementations, controller 420 may include a random access memory (RAM), a read only memory (ROM), and/or another type of dynamic or static storage device (e.g., a flash memory, a magnetic memory, an optical memory, etc.) that stores information and/or instructions for use by controller 420.

In some implementations, controller 420 may communicate with other devices, networks, and/or systems connected to device 400 to exchange information regarding network topology. Controller 420 may create routing tables based on the network topology information, create forwarding tables based on the routing tables, and forward the forwarding tables to input components 405 and/or output components 415. Input components 405 and/or output components 415 may use the forwarding tables to perform route lookups for incoming and/or outgoing packets.

Controller 420 may perform one or more processes described herein. Controller 420 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 420 from another computer-readable medium or from another device via a communication interface. When executed, software instructions stored in a memory and/or storage component associated with controller 420 may cause controller 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4A are provided as an example. In practice, device 400 may include additional components, fewer components, different components, or differently arranged components than those shown in FIG. 4A. Additionally, or alternatively, a set of components (e.g., one or more components) of device 400 may perform one or more functions described as being performed by another set of components of device 400.

FIG. 4B is a diagram of example components of a device 425. Device 425 may correspond to routing device 340 and/or security device 350. In some implementations, routing device 340 and/or security device 350 may include one or more devices 425 and/or one or more components of device 425. As shown in FIG. 4B, device 425 may include a bus 430, a processor 435, a memory 440, a storage component 445, an input component 450, an output component 455, and a communication interface 460.

Bus 430 includes a component that permits communication among the components of device 400. Processor 435 is implemented in hardware, firmware, or a combination of hardware and software. Processor 435 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 435 includes one or more processors capable of being programmed to perform a function. Memory 440 includes a random access memory (RAM), a read only memory (ROM), and/or another type of dynamic or static storage device (e.g., a flash memory, a magnetic memory, and/or an optical memory) that stores information and/or instructions for use by Processor 435.

Storage component 445 stores information and/or software related to the operation and use of device 400. For example, Storage component 445 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 455 includes a component that provides output information from device 400 (e.g., a display, a speaker, and/or one or more light-emitting diodes (LEDs)).

Communication interface 460 includes a transceiver-like component (e.g., a transceiver and/or a separate receiver and transmitter) that enables device 400 to communicate with other devices, such as via a wired connection, a wireless connection, or a combination of wired and wireless connections. Communication interface 460 may permit device 400 to receive information from another device and/or provide information to another device. For example, communication interface 460 may include an Ethernet interface, an optical interface, a coaxial interface, an infrared interface, a radio frequency (RF) interface, a universal serial bus (USB) interface, a Wi-Fi interface, a cellular network interface, or the like.

Device 425 may perform one or more processes described herein. Device 400 may perform these processes based on processor 435 executing software instructions stored by a non-transitory computer-readable medium, such as memory 440 and/or storage component 445. A computer-readable medium is defined herein as a non-transitory memory device. A memory device includes memory space within a single physical storage device or memory space spread across multiple physical storage devices.

Software instructions may be read into memory 440 and/or storage component 445 from another computer-readable medium or from another device via communication interface 460. When executed, software instructions stored in memory 440 and/or storage component 445 may cause processor 435 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4B are provided as an example. In practice, device 425 may include additional components, fewer components, different components, or differently arranged components than those shown in FIG. 4B. Additionally, or alternatively, a set of components (e.g., one or more components) of device 425 may perform one or more functions described as being performed by another set of components of device 425.

FIG. 5 is a flow chart of an example process 500 for blocking, detecting, and/or preventing malicious traffic. In some implementations, one or more process blocks of FIG. 5 may be performed by a security device (e.g., security device 350). In some implementations, one or more process blocks of FIG. 5 may be performed by another device or a group of devices separate from or including the security device (e.g., security device 350), such as a sinkhole server device (e.g., sinkhole server device 310), a client device (e.g., client device 330), a routing device (e.g., routing device 340), a security platform (e.g., security platform 370), and/or a computing resource (e.g., computing resource 375) of a cloud computing environment.

As shown in FIG. 5, process 500 may include obtaining information associated with a plurality of blacklisted domains, wherein the information includes blacklisted domain identifiers corresponding to blacklisted domains in the plurality of blacklisted domains (block 510). For example, the security device (e.g., using input component 405, switching component 410, controller 420, processor 435, memory 440, storage component 445, input component 450, communication interface 460, and/or the like) may obtain information associated with a plurality of blacklisted domains, as described above in connection with FIGS. 1A-1C. In some implementations, the information may include blacklisted domain identifiers corresponding to blacklisted domains in the plurality of blacklisted domains.

As further shown in FIG. 5, process 500 may include determining network addresses of devices hosting the plurality of blacklisted domains based on collecting domain name system (DNS) data associated with the blacklisted domain identifiers (block 520). For example, the security device (e.g., using input component 405, switching component 410, controller 420, processor 435, memory 440, storage component 445, input component 450, communication interface 460, and/or the like) may determine network addresses of devices hosting the plurality of blacklisted domains based on collecting domain name system (DNS) data associated with the blacklisted domain identifiers, as described above in connection with FIGS. 1A-1C.

As further shown in FIG. 5, process 500 may include storing the network addresses of the devices hosting the plurality of blacklisted domains and the blacklisted domain identifiers (block 530). For example, the security device (e.g., using controller 420, processor 435, memory 440, storage component 445, and/or the like) may store the network addresses of the devices hosting the plurality of blacklisted domains and the blacklisted domain identifiers, as described above in connection with FIGS. 1A-1C.

As further shown in FIG. 5, process 500 may include receiving traffic destined for a destination device associated with a destination network address (block 540). For example, the security device (e.g., using input component 405, switching component 410, controller 420, processor 435, memory 440, storage component 445, input component 450, communication interface 460, and/or the like) may receive one or more packets destined for a destination device associated with a destination network address, as described above in connection with FIGS. 1A-1C.

As further shown in FIG. 5, process 500 may include comparing the destination network address and the network addresses stored in the data structure (block 550). For example, the security device (e.g., using controller 420, processor 435, memory 440, storage component 445, and/or the like) may compare the destination network address and the network addresses stored in the data structure, as described above in connection with FIGS. 1A-1C.

As further shown in FIG. 5, process 500 may include performing an action based on a result of comparing the destination network address and the network addresses (block 560). For example, the security device (e.g., using switching component 410, output component 415, controller 420, processor 435, memory 440, storage component 445, input component 450, output component 455, communication interface 460, and/or the like) may perform an action based on a result of comparing the destination network address and the network addresses, as described above in connection with FIGS. 1A-1C.

Process 500 may include additional implementations, such as any single implementation or any combination of implementations described below and/or described with regard to any other process described herein.

In some implementations, the action may include determining that the destination network address does not correspond to any network address of the network addresses, and routing the one or more packets towards the destination device based on determining that the destination network address does not correspond to any network address of the network addresses.

In some implementations, the action may include determining that the destination network address corresponds to a network address of the network addresses, determining that the traffic corresponds to HTTP traffic, parsing a header of the HTTP traffic to determine a packet domain identifier, comparing the packet domain identifier to the blacklisted domain identifiers stored in the data structure, determining that the packet domain identifier corresponds to a blacklisted domain identifier stored in the data structure, obtaining a plurality of sinkhole server identifiers associated with the blacklisted domain identifier, selecting a sinkhole server identifier from the plurality of sinkhole server identifiers associated with the blacklisted domain identifier, and HTTP redirecting the HTTP traffic towards a sinkhole server associated with the sinkhole server identifier.

In some implementations, when selecting the sinkhole server identifier, the security device may identify a first geographic location corresponding to a client device from which the one or more packets were received, may identify multiple second geographic locations corresponding to the multiple sinkhole server identifiers, and may select the sinkhole server identifier associated with the sinkhole server that is geographically closest to the first geographic location. In some implementations, when selecting the sinkhole server identifier, the security device may select the sinkhole server identifier based on a round-robin scheduling process.

In some implementations, the action may include determining that the destination network address corresponds to a network address of the network addresses, determining that the network address corresponds to a blacklisted domain identifier, determining that the traffic corresponds to non- HTTP traffic, obtaining a plurality of sinkhole server identifiers associated with the blacklisted domain identifier, selecting a sinkhole server identifier from the plurality of sinkhole server identifiers associated with the blacklisted domain identifier, and performing a Network Address Translation (NAT) of the non-HTTP traffic by replacing the destination network address in the non-HTTP traffic with the sinkhole server identifier to redirect the one or more packets towards a sinkhole server associated with the sinkhole server identifier.

In some implementations, when determining the network addresses, the security device may generate DNS requests that include the blacklisted domain identifiers, may send the DNS requests to a DNS server, and may receive, from the DNS server, responses to the DNS requests. In some implementations, the responses may include the network addresses of the devices hosting the plurality of blacklisted domains. In some implementations, the security device may cache the network addresses included in the responses to the DNS requests.

In some implementations, when determining the network addresses, the security device may intercept DNS messages being exchanged between a DNS resolver device and a DNS server device. In some implementations, the DNS messages may include the network addresses of the devices hosting the plurality of blacklisted domains. In some implementations, the security device may cache the network addresses included in the DNS messages.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
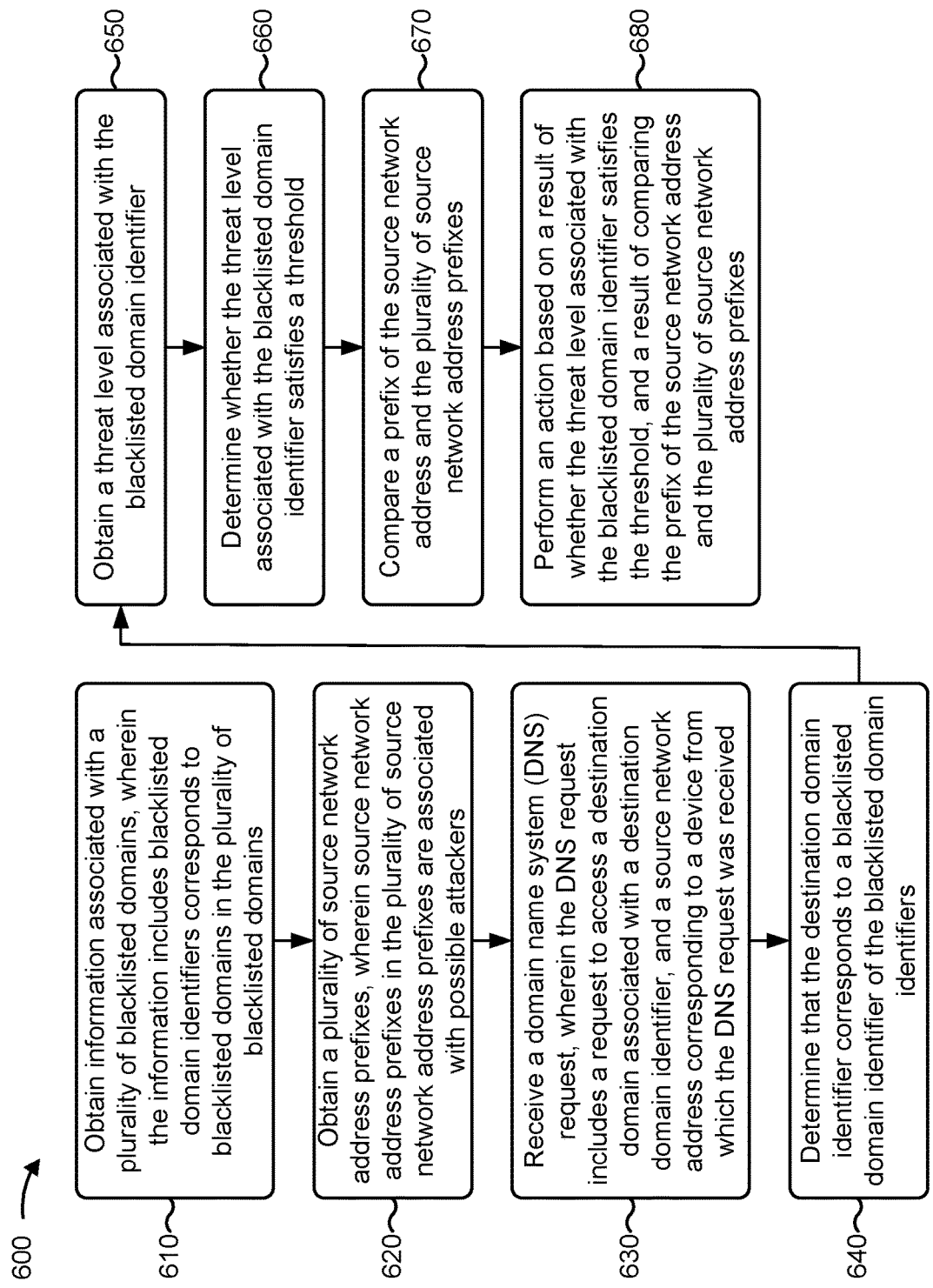
FIG. 6 is a flow chart of an example process for blocking, detecting, and/or preventing malicious traffic.

FIG. 6 is a flow chart of an example process 600 for blocking, detecting, and/or preventing malicious traffic. In some implementations, one or more process blocks of FIG. 6 may be performed by a security device (e.g., security device 350). In some implementations, one or more process blocks of FIG. 6 may be performed by another device or a group of devices separate from or including the security device (e.g., security device 350), such as a sinkhole server device (e.g., sinkhole server device 310), a client device (e.g., client device 330), a routing device (e.g., routing device 340), a security device (e.g., security device 350), a security platform (e.g., security platform 370), and/or a computing resource (e.g., computing resource 375) of a cloud computing environment.

As shown in FIG. 6, process 600 may include obtaining information associated with a plurality of blacklisted domains, wherein the information includes blacklisted domain identifiers corresponds to blacklisted domains in the plurality of blacklisted domains (block 610). For example, the security device (e.g., using input component 405, switching component 410, controller 420, processor 435, memory 440, storage component 445, input component 450, communication interface 460, and/or the like) may obtain information associated with a plurality of blacklisted domains, as described above in connection with FIGS. 2A-2D. In some implementations, the information may include blacklisted domain identifiers corresponding to blacklisted domains in the plurality of blacklisted domains.

As further shown in FIG. 6, process 600 may include obtaining a plurality of source network address prefixes, wherein source network address prefixes in the plurality of source network address prefixes are associated with possible attackers (block 620). For example, the security device (e.g., using input component 405, switching component 410, controller 420, processor 435, memory 440, storage component 445, input component 450, communication interface 460, and/or the like) may obtain a plurality of source network address prefixes, as described above in connection with FIGS. 2A-2D. In some implementations, the source network address prefixes in the plurality of source network address prefixes may be associated with possible attackers.

As further shown in FIG. 6, process 600 may include receiving a domain name system (DNS) request, wherein the DNS request includes a request to access a destination domain associated with a destination domain identifier, and a source network address corresponding to a device from which the DNS request was received (block 630). For example, the security device (e.g., using input component 405, switching component 410, controller 420, processor 435, memory 440, storage component 445, input component 450, communication interface 460, and/or the like) may receive a domain name system (DNS) request, as described above in connection with FIGS. 2A-2D. In some implementations, the DNS request may include a request to access a destination domain associated with a destination domain identifier, and a source network address corresponding to a device from which the DNS request was received.

As further shown in FIG. 6, process 600 may include determining that the destination domain identifier corresponds to a blacklisted domain identifier of the blacklisted domain identifiers (block 640). For example, the security device (e.g., using controller 420, processor 435, memory 440, storage component 445, and/or the like) may determine that the destination domain identifier corresponds to a blacklisted domain identifier of the blacklisted domain identifiers, as described above in connection with FIGS. 2A-2D.

As further shown in FIG. 6, process 600 may include obtaining a threat level associated with the blacklisted domain identifier (block 650). For example, the security device (e.g., using input component 405, switching component 410, controller 420, processor 435, memory 440, storage component 445, input component 450, communication interface 460, and/or the like) may obtain a threat level associated with the blacklisted domain identifier, as described above in connection with FIGS. 2A-2D.

As further shown in FIG. 6, process 600 may include determining whether the threat level associated with the blacklisted domain identifier satisfies a threshold (block 660). For example, the security device (e.g., using controller 420, processor 435, memory 440, storage component 445, and/or the like) may determine whether the threat level associated with the blacklisted domain identifier satisfies a threshold, as described above in connection with FIGS. 2A-2D.

As further shown in FIG. 6, process 600 may include comparing a prefix of the source network address and the plurality of source network address prefixes (block 670). For example, the security device (e.g., using controller 420, processor 435, memory 440, storage component 445, and/or the like) may compare a prefix of the source network address and the plurality of source network address prefixes, as described above in connection with FIGS. 2A-2D.

As further shown in FIG. 6, process 600 may include performing an action based on a result of whether the threat level associated with the blacklisted domain identifier satisfies the threshold, and a result of comparing the prefix of the source network address and the plurality of source network address prefixes (block 680). For example, the security device (e.g., using input component 405, switching component 410, output component 415, controller 420, processor 435, memory 440, storage component 445, input component 450, output component 455, communication interface 460, and/or the like) may perform an action based on a result of whether the threat level associated with the blacklisted domain identifier satisfies the threshold, and a result of comparing the prefix of the source network address and the plurality of source network address prefixes, as described above in connection with FIGS. 2A-2D.

Process 600 may include additional implementations, such as any single implementation or any combination of implementations described below and/or described with regard to any other process described herein.

In some implementations, the action may include determining that the prefix of the source network address corresponds to a source network address prefix of the plurality of source network address prefixes, obtaining a plurality of sinkhole server identifiers associated with the source network address prefix, selecting a sinkhole server identifier from the plurality of sinkhole server identifiers associated with the source network address prefix, generating a DNS response including the sinkhole server identifier, and responding to the DNS request with the DNS response. In some implementations, the DNS response may include a time-to-live value set to zero.

In some implementations, the action may include determining that the prefix of the source network address does not correspond to any source network address prefix of the plurality of source network address prefixes, determining that the threat level associated with the blacklisted domain identifier satisfies the threshold, obtaining a plurality of sinkhole server identifiers associated with the blacklisted domain identifier, selecting a sinkhole server identifier from the plurality of sinkhole server identifiers associated with the blacklisted domain identifier, generating a DNS response including the sinkhole server identifier, and responding to the DNS request with the DNS response. In some implementations, the DNS response includes a time-to-live value set to zero.

In some implementations, the security device may add the source network address of the device from which the DNS request was received to a list of possible attackers, and monitor a count of DNS requests received from the source network address. In some implementations, the security device may block DNS requests received from the source network address when the count of the DNS requests satisfies a threshold. In some implementations, the security device may report the source network address to a cloud-based security platform when the count of the DNS requests satisfies a threshold. The cloud-based security platform may build a global attacker database including the source network address and share the global attacker database with at least one other cloud-based security platform for globally blocking the attackers.

In some implementations, one or more process blocks of FIG. 6 may be performed by a processor or a controller (e.g., processor 435 or controller 420). In some implementations, the processor may be disposed in the routing device (e.g., routing device 340) or the security device (e.g., security device 350) attached to the routing device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for blocking, detecting, and/or preventing malicious traffic. In some implementations, one or more process blocks of FIG. 7 may be performed by a network device, such as a security device (e.g., security device 350) and/or a routing device (e.g., routing device 340). In some implementations, one or more process blocks of FIG. 7 may be performed by another device or a group of devices separate from or including the network device (e.g., the security device 350 and/or the routing device 340), such as a sinkhole server device (e.g., sinkhole server device 310), a client device (e.g., client device 330), a security platform (e.g., security platform 370), and a computing resource (e.g., computing resource 375) of a cloud computing environment.

As shown in FIG. 7, process 700 may include obtaining information associated with a plurality of blacklisted domains, wherein the information includes blacklisted domain identifiers, and sinkhole server identifiers associated with the blacklisted domain identifiers (block 710). For example, the security device (e.g., using input component 405, switching component 410, controller 420, processor 435, memory 440, storage component 445, input component 450, communication interface 460, and/or the like) may obtain information associated with a plurality of blacklisted domains, as described above in connection with FIGS. 1A-2D. In some implementations, the information may include blacklisted domain identifiers, and sinkhole server identifiers associated with the blacklisted domain identifiers.

As further shown in FIG. 7, process 700 may include obtaining a set of rules, wherein the set of rules specify match criteria associated with the plurality of blacklisted domains, wherein the match criteria include a plurality of source network addresses and/or a plurality of destination network addresses for comparison to packet source network addresses and/or packet destination network addresses associated with incoming packets, and wherein the set of rules specify actions to perform based on a result of comparing the match criteria and the packet source network addresses and/or the packet destination network addresses for the incoming packets (block 720). For example, the security device (e.g., using input component 405, switching component 410, controller 420, processor 435, memory 440, storage component 445, input component 450, communication interface 460, and/or the like) may obtain a set of rules, as described above in connection with FIGS. 1A-2D. In some implementations, the set of rules may specify match criteria associated with the plurality of blacklisted domains, the match criteria may include a plurality of source network addresses and/or a plurality of destination network addresses for comparison to packet source network addresses and/or packet destination network addresses associated with incoming packets, and the set of rules may specify actions to perform based on a result of comparing the match criteria and the packet source network addresses and/or the packet destination network addresses for the incoming packets.

As further shown in FIG. 7, process 700 may include receiving one or more packets (block 730). For example, the security device (e.g., using input component 405, switching component 410, controller 420, processor 435, memory 440, storage component 445, input component 450, communication interface 460, and/or the like) may receive one or more packets, as described above in connection with FIGS. 1A-2D.

As further shown in FIG. 7, process 700 may include examining a packet source network address and/or a packet destination network address associated with the one or more packets (block 740). For example, the security device (e.g., switching component 410, controller 420, processor 435, memory 440, storage component 445, communication interface 460, and/or the like) may examine a packet source network address and/or a packet destination network address associated with the one or more packets, as described above in connection with FIGS. 1A-2D.

As further shown in FIG. 7, process 700 may include comparing the packet source network address and/or the packet destination network address to the match criteria (block 750). For example, the security device (e.g., using controller 420, processor 435, memory 440, storage component 445, and/or the like) may compare the packet source network address and/or the packet destination network address to the match criteria, as described above in connection with FIGS. 1A-2D.

As further shown in FIG. 7, process 700 may include performing an action based on a result of comparing the packet source network address and/or the packet destination network address to the match criteria specified by the set of rules (block 760). For example, the security device (e.g., using input component 405, switching component 410, output component 415, controller 420, processor 435, memory 440, storage component 445, input component 450, output component 455, communication interface 460, and/or the like) may perform an action based on a result of comparing the packet source network address and/or the packet destination network address to the match criteria specified by the set of rules, as described above in connection with FIGS. 1A-2D.

Process 700 may include additional implementations, such as any single implementation or any combination of implementations described below and/or described with regard to any other process described herein.

In some implementations, the security device may determine that the packet destination network address satisfies the match criteria, determine that the packet destination network address corresponds to an address of a blacklisted domain identifier, select a sinkhole server identifier associated with the blacklisted domain identifier, and route the one or more packets to a sinkhole server associated with the sinkhole server identifier.

In some implementations, the security device may identify a first geographic location corresponding to a device having the packet source network address, identify multiple second geographic locations corresponding to multiple sinkhole server identifiers associated with the blacklisted domain identifier, and select the sinkhole server identifier associated with the sinkhole server having the second geographic location that is geographically closest to the first geographic location.

In some implementations, the security device may select the sinkhole server identifier based on a round-robin scheduling process. In some implementations, the security device may determine that the packet source network address satisfies the match criteria, obtain a plurality of sinkhole server identifiers associated with the packet source network address, select a sinkhole server identifier from the plurality of sinkhole server identifiers, generate a message including the sinkhole server identifier, and send the message to a device corresponding to the packet source network address. In some implementations, the message includes a domain name system (DNS) response having a time-to-live value set to zero.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Some implementations described herein include network devices, including security devices 350 configured to block, detect, and/or prevent malicious traffic in a network 380. Security devices 350 may be implemented as a network device (e.g., a routing device 340, and/or the like) and/or a security device 350 attached to a network device (e.g., a physical interface card of a routing device 340, and/or the like). In some implementations, security devices 350 may block malicious traffic in network 380. For example, a country or a customer may specify a list of blacklisted domains, which the country or the customer desires to prevent users from accessing. As an example, the blacklisted domains may be associated with an attacker device or an attacker's website. In some implementations, security devices 350 may be configured to proactively perform mining techniques to resolve network addresses for devices hosting the blacklisted domains. Security devices 350 may utilize match criteria included in match-based filters and/or rules to block traffic destined to the resolved network addresses. For example, security devices 350 may block traffic destined to network addresses associated with webservers hosting the blacklisted domains, and redirect the traffic towards a sinkhole server device 310. In this way, network security may be improved as malicious traffic and/or access to malicious content is more efficiently blocked. Furthermore, traffic from attackers that bypass DNS sinkhole functionality may be blocked, logged, and/or prevented from accessing an intended destination.

In some implementations, security devices 350 may detect malicious traffic in network 380 and/or prevent the malicious traffic from reaching other devices (e.g., server devices, sinkhole server devices, etc.) in network 380. For example, security device 350 may receive a DNS request, determine that the DNS request is associated with a possible attacker, and respond to the DNS request with a DNS response that includes a time-to-live value set to zero. In this way, the DNS response may not be cached by the possible attacker, so that subsequent DNS requests from the same source network address may be logged and investigated. Where the source device is identified as an attacker, the security device may notify a cloud-based security platform so that the attacker may be globally blocked. In this way, security across one or more networks may be improved as attackers may be elegantly identified and prevented from reaching backend devices in the one or more networks.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   obtaining, by a processor, information associated with a plurality of blacklisted domains,
      wherein the information includes blacklisted domain identifiers corresponding to blacklisted domains in the plurality of blacklisted domains;
   determining, by the processor, network addresses of devices hosting the plurality of blacklisted domains based on collecting domain name system (DNS) data associated with the blacklisted domain identifiers;
   storing, by the processor and in a data structure, the network addresses;
   receiving, by the processor, traffic destined for a destination device associated with a destination network address;
   comparing, by the processor, the destination network address and the network addresses stored in the data structure; and
   performing an action, by the processor, based on a result of comparing the destination network address and the network addresses,
      wherein the action includes:
         responding to a DNS request with the DNS response, wherein the DNS response includes a time-to-live value set to zero to prevent the DNS response from being cached and to minimize bombarding of network devices;
         monitoring a count of DNS requests received from a source network address associated with the DNS request; and
         determining that the DNS request is associated with an attacker based on the count satisfying a threshold.

2. The method of claim 1, wherein the action further includes:
   determining that the destination network address corresponds to a network address of the network addresses;
   determining that the traffic corresponds to HTTP traffic;
   parsing a header of HTTP traffic to determine a domain identifier;
   comparing the domain identifier to the blacklisted domain identifiers stored in the data structure;
   determining that the domain identifier corresponds to a blacklisted domain identifier of the blacklisted domain identifiers;
   obtaining a plurality of sinkhole server identifiers associated with the blacklisted domain identifier;
   selecting a sinkhole server identifier from the plurality of sinkhole server identifiers associated with the blacklisted domain identifier; and
   HTTP redirecting the HTTP traffic towards a sinkhole server associated with the sinkhole server identifier.

3. The method of claim 2, wherein selecting the sinkhole server identifier includes:
   identifying a first geographic location corresponding to a client device from which the traffic was received;
   identifying a plurality of second geographic locations corresponding to the plurality of sinkhole server identifiers; and
   selecting the sinkhole server identifier associated with the sinkhole server that is geographically closest to the first geographic location.

4. The method of claim 2, wherein selecting the sinkhole server identifier includes selecting the sinkhole server identifier based on a round-robin scheduling process.

5. The method of claim 1, wherein the action further includes:
   determining that the destination network address corresponds to a network address of the network addresses;
   determining that the traffic is non-HTTP traffic;
   determining that the network address corresponds to a blacklisted domain identifier of the blacklisted domain identifiers;
   obtaining a plurality of sinkhole server identifiers associated with the blacklisted domain identifier;
   selecting a sinkhole server identifier from the plurality of sinkhole server identifiers associated with the blacklisted domain identifier; and
   performing a Network Address Translation (NAT) of the non-HTTP traffic by replacing the destination network address in the non-HTTP traffic with the sinkhole server identifier to redirect the non-HTTP traffic towards a sinkhole server associated with the sinkhole server identifier.

6. The method of claim 1, wherein determining the network addresses of the devices hosting the plurality of blacklisted domains comprises:
   generating DNS requests that include the blacklisted domain identifiers;
   sending the DNS requests to a DNS server;
   receiving, from the DNS server, responses to the DNS requests,
      wherein the responses include the network addresses of the devices hosting the plurality of blacklisted domains; and
   caching the network addresses included in the responses to the DNS requests.

7. The method of claim 1, wherein determining the network addresses of the devices hosting the plurality of blacklisted domains comprises:
intercepting DNS messages being exchanged between a DNS resolver device and a DNS server device,
wherein the DNS messages include the network addresses of the devices hosting the plurality of blacklisted domains; and
caching the network addresses included in the DNS messages.

8. A method, comprising:
obtaining, by a processor, information associated with a plurality of blacklisted domains,
wherein the information includes blacklisted domain identifiers corresponding to blacklisted domains in the plurality of blacklisted domains;
obtaining, by the processor, a plurality of source network address prefixes,
wherein source network address prefixes in the plurality of source network address prefixes are associated with possible attackers;
receiving, by the processor, a domain name system (DNS) request,
wherein the DNS request includes:
a request to access a destination domain associated with a destination domain identifier, and
a source network address corresponding to a device from which the DNS request was received;
determining, by the processor, that the destination domain identifier corresponds to a blacklisted domain identifier of the blacklisted domain identifiers;
obtaining, by the processor, a threat level associated with the blacklisted domain identifier;
determining, by the processor, whether the threat level associated with the blacklisted domain identifier satisfies a threshold;
comparing, by the processor, a prefix of the source network address and the plurality of source network address prefixes; and
performing an action, by the processor, based on:
a result of whether the threat level associated with the blacklisted domain identifier satisfies the threshold,
a result of comparing the prefix of the source network address and the plurality of source network address prefixes, and
wherein the action includes:
determining whether the prefix of the source network address corresponds to a source network address prefix of the plurality of source network address prefixes;
obtaining a plurality of sinkhole server identifiers,
wherein a first set of sinkhole server identifiers associated with the blacklisted domain identifier are obtained when the prefix of the source network address corresponds to the source network address prefix, or
wherein a second set of sinkhole server identifiers associated with the blacklisted domain identifier are obtained when the prefix of the source network address does not correspond to the source network address prefix,
selecting a sinkhole server identifier from the plurality of sinkhole server identifiers based on obtaining the plurality of sinkhole server identifiers;
generating a DNS response including the sinkhole server identifier; and
responding to a DNS request with the DNS response,
wherein the DNS response includes a time-to-live value set to zero to prevent the DNS response from being cached and to minimize bombarding of network devices.

9. The method of claim 8, wherein the action includes:
determining that the prefix of the source network address does not correspond to any of the plurality of source network address prefixes; and
determining that the threat level associated with the blacklisted domain identifier satisfies the threshold.

10. The method of claim 8, further comprising:
adding the source network address of the device from which the DNS request was received to a list of possible attackers; and
monitoring a count of DNS requests received from the source network address.

11. The method of claim 10, further comprising:
blocking DNS requests received from the source network address when the count of the DNS requests satisfies the threshold.

12. The method of claim 10, further comprising:
reporting the source network address to a cloud-based security platform when the count of the DNS requests satisfies the threshold;
building a global attacker database including the source network address; and
sharing the global attacker database with at least one additional cloud-based security platform.

13. The method of claim 8, wherein the processor is disposed in a routing device or a security device attached to the routing device.

14. A network device, comprising:
one or more memories; and
one or more processors to:
obtain information associated with a plurality of blacklisted domains,
wherein the information includes:
blacklisted domain identifiers, and
sinkhole server identifiers associated with the blacklisted domain identifiers;
obtain a set of rules,
wherein the set of rules specify match criteria associated with the plurality of blacklisted domains,
wherein the match criteria include a plurality of source network addresses and/or a plurality of destination network addresses for comparison to packet source network addresses and/or packet destination network addresses associated with incoming packets, and
wherein the set of rules specify actions to perform based on a result of comparing the match criteria and the packet source network addresses and/or the packet destination network addresses for the incoming packets;
receive one or more packets;
examine a packet source network address and/or a packet destination network address associated with the one or more packets;
compare the packet source network address and/or the packet destination network address to the match criteria; and
perform an action, of the actions, based on a result of comparing the packet source network address and/or the packet destination network address to the match criteria specified by the set of rules,
wherein the action includes:

responding to a DNS request with a DNS response,
wherein the DNS response includes a time-to-live value set to zero to prevent the DNS response from being cached and to minimize bombarding of network devices;
monitoring a count of DNS requests received from the packet source network address and/or the packet destination network address associated with the DNS request; and
determining that the DNS request is associated with an attacker based on the count satisfying a threshold.

15. The network device of claim 14, wherein the one or more processors are further to:
determine that the packet destination network address satisfies the match criteria;
determine that the packet destination network address corresponds to an address of a blacklisted domain identifier of the blacklisted domain identifiers;
select a sinkhole server identifier of sinkhole server identifiers associated with the blacklisted domain identifier; and
redirect the one or more packets to a sinkhole server associated with the sinkhole server identifier.

16. The network device of claim 15, wherein the one or more processors are further to:
identify a first geographic location corresponding to a device having the packet source network address;
identify multiple second geographic locations corresponding to multiple sinkhole server identifiers associated with the blacklisted domain identifier; and
select the sinkhole server identifier associated with the sinkhole server having a second geographical location, of the multiple second geographic locations, that is geographically closest to the first geographic location.

17. The network device of claim 15, wherein the one or more processors are further to:
select the sinkhole server identifier based on a round-robin scheduling process.

18. The network device of claim 14, wherein the one or more processors are further to:
determine that the packet source network address satisfies the match criteria;
obtain a plurality of sinkhole server identifiers associated with the packet source network address;
select a sinkhole server identifier from the plurality of sinkhole server identifiers;
generate a message including the sinkhole server identifier; and
send the message to a device corresponding to the packet source network address,
wherein the message includes the DNS response having the time-to-live value set to zero.

19. The method of claim 2, wherein the plurality of sinkhole server identifiers associated with the blacklisted domain identifier correspond to Internet protocol (IP) v4 addresses and/or IPv6 addresses.

20. The method of claim 8, further comprising:
monitoring a count of DNS requests received from the source network address prefix; and
determining that the DNS request is associated with an attacker based on the count satisfying the threshold.

* * * * *